United States Patent
Barnes et al.

(10) Patent No.: US 11,092,678 B2
(45) Date of Patent: Aug. 17, 2021

(54) MEASURING AND REMOVING THE CORRUPTION OF TIME-OF-FLIGHT DEPTH IMAGES DUE TO INTERNAL SCATTERING

(71) Applicant: Analog Devices, Inc., Norwood, MA (US)

(72) Inventors: Erik D. Barnes, Cambridge, MA (US); Charles Mathy, Arlington, MA (US); Sefa Demirtas, Winchester, MA (US)

(73) Assignee: ANALOG DEVICES, INC., Wilmington, MA (US)

( * ) Notice: Subject to any disclaimer, the term of this patent is extended or adjusted under 35 U.S.C. 154(b) by 0 days.

(21) Appl. No.: 16/387,385

(22) Filed: Apr. 17, 2019

(65) Prior Publication Data

US 2019/0391238 A1 Dec. 26, 2019

Related U.S. Application Data

(60) Provisional application No. 62/715,695, filed on Aug. 7, 2018, provisional application No. 62/687,851, filed on Jun. 21, 2018.

(51) Int. Cl.
*G01S 7/487* (2006.01)
*G01S 7/48* (2006.01)
(Continued)

(52) U.S. Cl.
CPC .......... *G01S 7/4876* (2013.01); *G01S 7/4808* (2013.01); *G01S 17/10* (2013.01); *G01S 17/894* (2020.01); *H04N 5/2256* (2013.01); *H04N 5/243* (2013.01)

(58) Field of Classification Search
CPC ....... H04N 5/243; G01S 7/4876; G01S 17/10; G01S 7/4808; G01S 17/894; G01S 7/4865; G01S 17/08
See application file for complete search history.

(56) References Cited

U.S. PATENT DOCUMENTS 6,373,557 B1 4/2002 Mengel et al.
8,405,821 B2 3/2013 Rieme
(Continued)

FOREIGN PATENT DOCUMENTS

CN 106772265 5/2017
EP 3301479 4/2018
(Continued)

OTHER PUBLICATIONS

English Translation of Bibliographic Data, Description and Claims (using Patent Translate) of JP 2008-145237, 8 pages.
(Continued)

*Primary Examiner* — Boubacar Abdou Tchoussou
(74) *Attorney, Agent, or Firm* — Patent Capital Group

(57) ABSTRACT

Depth imagers can implement time-of-flight operations to measure depth or distance of objects. A depth imager can emit light onto a scene and sense light reflected back from the objects in the scene using an array of sensors. Timing of the reflected light hitting the array of sensors gives information about the depth or distance of objects in the scene. In some cases, corrupting light that is outside of a field of view of a pixel in the array of sensors can hit the pixel due to internal scattering or internal reflections occurring in the depth imager. The corrupting light can corrupt the depth or distance measurement. To address this problem, an improved depth imager can isolate and measure the corrupting light due to internal scattering or internal reflections occurring in the depth imager, and systematically remove the measured corrupting light from the depth or distance measurement.

20 Claims, 12 Drawing Sheets

(51) Int. Cl.
*G01S 17/10* (2020.01)
*H04N 5/225* (2006.01)
*H04N 5/243* (2006.01)
*G01S 17/894* (2020.01)

(56) References Cited

U.S. PATENT DOCUMENTS

| | | | |
|---|---|---|---|
| 1,010,377 | A1 | 10/2018 | Thompson et al. |
| 2013/0208257 | A1 | 8/2013 | Dyer |
| 2014/0078488 | A1 | 3/2014 | Hoashi |
| 2016/0178734 | A1 | 6/2016 | Kawamura et al. |
| 2017/0343675 | A1 | 11/2017 | Oggier et al. |
| 2017/0366726 | A1* | 12/2017 | Yanagida ............... H04N 5/359 |
| 2018/0053799 | A1* | 2/2018 | Otani .................... H01L 31/101 |
| 2018/0120423 | A1* | 5/2018 | Nishikawa ............. G01S 17/89 |
| 2018/0167562 | A1* | 6/2018 | Suzuki ................... G01S 17/89 |
| 2019/0086521 | A1* | 3/2019 | Boutaud ............... G01S 7/4865 |
| 2019/0391266 | A1 | 12/2019 | Mori et al. |
| 2020/0025894 | A1* | 1/2020 | Van Dyck ............. G01S 7/4876 |

FOREIGN PATENT DOCUMENTS

| | | |
|---|---|---|
| EP | 3550330 | 10/2019 |
| JP | 2002-500367 | 1/2002 |
| JP | 2008-145237 | 6/2006 |
| JP | 2013-003071 | 1/2013 |
| JP | 2014-059223 | 4/2014 |
| JP | 2014-228304 | 12/2014 |
| WO | 2018-101187 | 6/2018 |
| WO | 2018101187 | 6/2018 |

OTHER PUBLICATIONS

English Translation of Bibliographic Data, Description and Claims (using Patent Translate) of JP 2013-003071A, 28 pages.
English Translation of Bibliographic Data, Description and Claims (using Patent Translate) of JP 2014-228304A, 13 pages.
JP Office Action issued in JP 2019-115672 dated Aug. 11, 2020, 8 pages [includes EN Summary of Relevance, plus List of Citations].
EP Search Opinion dated Oct. 24, 2019 in EP Application No. 19180686.8.
Mure-Dubois et al., *Real-Time Scattering Compensation for Time-of-Flight Camera*, Proceedings of the 5$^{th}$ International Conference on Computer Vision Systems (ICCVS 2007), 10 pages.
Mure-Dubois et al., *Optimized Scattering Compensation for Time-of-Flight Camera*, Proceedings of the SPIE Three-Dimensional Methods for Inspection and Metrology V, 6762 (SPIE 2007), 10 pages.
Jamtsho et al., *Modeling Scattering Distortion in 3D Range Camera*, International Archives of Photogrammetry, Remote Sensing and Spatial Information Sciences, vol. XXXVIII, Part 5, Commission V Symposium, Newcastle upon Tyne, UK, 2010, 6 pages.
Shäfer et al., *Model Based Scattering Correction in Time-of-Flight Cameras*, © 2014 Optical Society of America, 12 pages.
Dorrington et al., *Separating True Range Measurement From Multi-Path and Scattering Interference in Commercial Range Cameras*, Proc. SPIE 7864, Three-Dimensional Imaging, Interaction and Measurement, 786404, Jan. 27, 2011, 11 pages.
Fuchs, *Calibration and Multipath Mitigation for Increased Accuracy of Time-of-Flight Camera Measurements in Robotic Applications*, Dissertation, Berlin 2012, 174 pages.
Kadambi et al., *Coded Time of Flight Cameras: Sparse Deconvolution to Address Multipath Interference and Recover Time Profiles*, ACM Transaction on Graphics, vol. 32, No. 6, Article 167, Nov. 2013, 10 pages.
Karel et al., *Modelling and Compensating Internal Light Scattering in Time of Flight Range Cameras*, The Photogrammetric Record, 27(138): 155-174 (Jun. 2012), 20 pages.
Karel et al., *Quantifying the Distortion of Distance Observations Caused by Scatting in Time-of-Flight Range Cameras*, International Archives of Photogrammetry, Remote Sensing and Spatial Information Sciences, vol. XXXVIII, Part 5, Commission V Symposium, Newcastle upon Tyne, UK, 2010, 6 pages.
Lefloch et al., *Technical Foundation and Calibration Methods for Time-of-Flight Cameras*, Germany, Sep. 23, 2013, 20 pages.
Naik et al., *Single View Reflectance Capture using Multiplexed Scattering and Time-of-Flight Imaging*, ACM Transaction on Graphics, vol. 30, No. 6, Article 171, Dec. 2011. 10 pages.

* cited by examiner

MEASURING AND REMOVING THE CORRUPTION OF TIME-OF-FLIGHT DEPTH IMAGES DUE TO INTERNAL SCATTERING

PRIORITY APPLICATION

This patent application claims priority to and receives benefit from U.S. Provisional Application, Ser. No. 62/687,851, titled "MEASURING AND REMOVING THE CORRUPTION OF TIME-OF-FLIGHT DEPTH IMAGES DUE TO INTERNAL SCATTERING", filed on Jun. 21, 2018, which is hereby incorporated in its entirety. This patent application also claims priority to and receives benefit from U.S. Provisional Application, Ser. No. 62/715,695, titled "AVOIDING THE CORRUPTION OF TIME-OF-FLIGHT DEPTH IMAGES DUE TO INTERNAL SCATTERING", filed on Aug. 7, 2018, which is also hereby incorporated in its entirety.

TECHNICAL FIELD OF THE DISCLOSURE

The present disclosure relates to the field of integrated circuits, in particular to circuits for time-of-flight depth imaging.

BACKGROUND

Depth imaging techniques are implemented in time-of-flight cameras and range finders. Depth imaging techniques include pulsing light sources, and measuring reflected light to sense the presence, distance information, depth information, and/or speed information of an object. These optical systems have a wide range of uses, such as security systems, medical systems, automotive systems, aerospace systems, consumer electronic devices, etc.

Depth imagers can include a light source (e.g., light emitting diodes, lasers, etc.). Depth imagers can also include an array of sensors that create a depth image of a scene, where each pixel stores the distance to the object in the field of view of that pixel. Such imagers may also simultaneously output a regular image of the scene, such as a red-green-blue (RGB) image or infrared image.

An example of a depth imaging technique for creating depth images is time-of-flight imaging. Time-of-flight operates by having a light source emit light onto the scene. Light is then reflected off the objects in the scene. Reflected light hits the array of sensors. The signals generated by the array of sensors can be used to calculate distance information and form a depth image.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Depth imagers can implement time-of-flight operations to measure depth or distance of objects. A depth imager can emit light onto a scene and sense light reflected back from the objects in the scene using an array of sensors. Timing of the reflected light hitting the array of sensors gives information about the depth or distance of objects in the scene. In some cases, corrupting light that is outside of a field of view of a pixel in the array of sensors can hit the pixel due to internal scattering or internal reflections occurring in the depth imager. The corrupting light can corrupt the depth or distance measurement. To address this problem, an improved depth imager can isolate and measure the corrupting light due to internal scattering or internal reflections occurring in the depth imager, and systematically remove the measured corrupting light from the depth or distance measurement.

Sources which can Corrupt Time-of-Flight Measurements

Typically, a light source of a depth imager is close to (or adjacent to) the array of sensors and moves along with the array of sensors if the array of sensors is mobile (e.g., the light source has a fixed position with respect to the array of sensors). For simplicity, the array of sensors is sometimes herein referred to as "sensor". In some other cases, one could consider a static light source as well, or any light source whose position is known over time.

Referring to the case with the light source of a depth imager close to the sensor, it can be understood that the time it takes for the light to return and hit the sensor is proportional to the distance to the object. More precisely, the depth D of an object is given by the equation:

$$D = \frac{c\, t_R}{2} \qquad \text{(eq. 1)}$$

where c is the speed of light, $t_R$ is the time it takes for the light to travel to the object, return, and hit the sensor. The factor of 2 in equation (1) is due to the light having to travel to the object and return from the object. The relationship between $t_R$ and D can be different, in some cases more complicated, than equation (1) depending on the location of the light source relative to the sensor.

Figure 1:
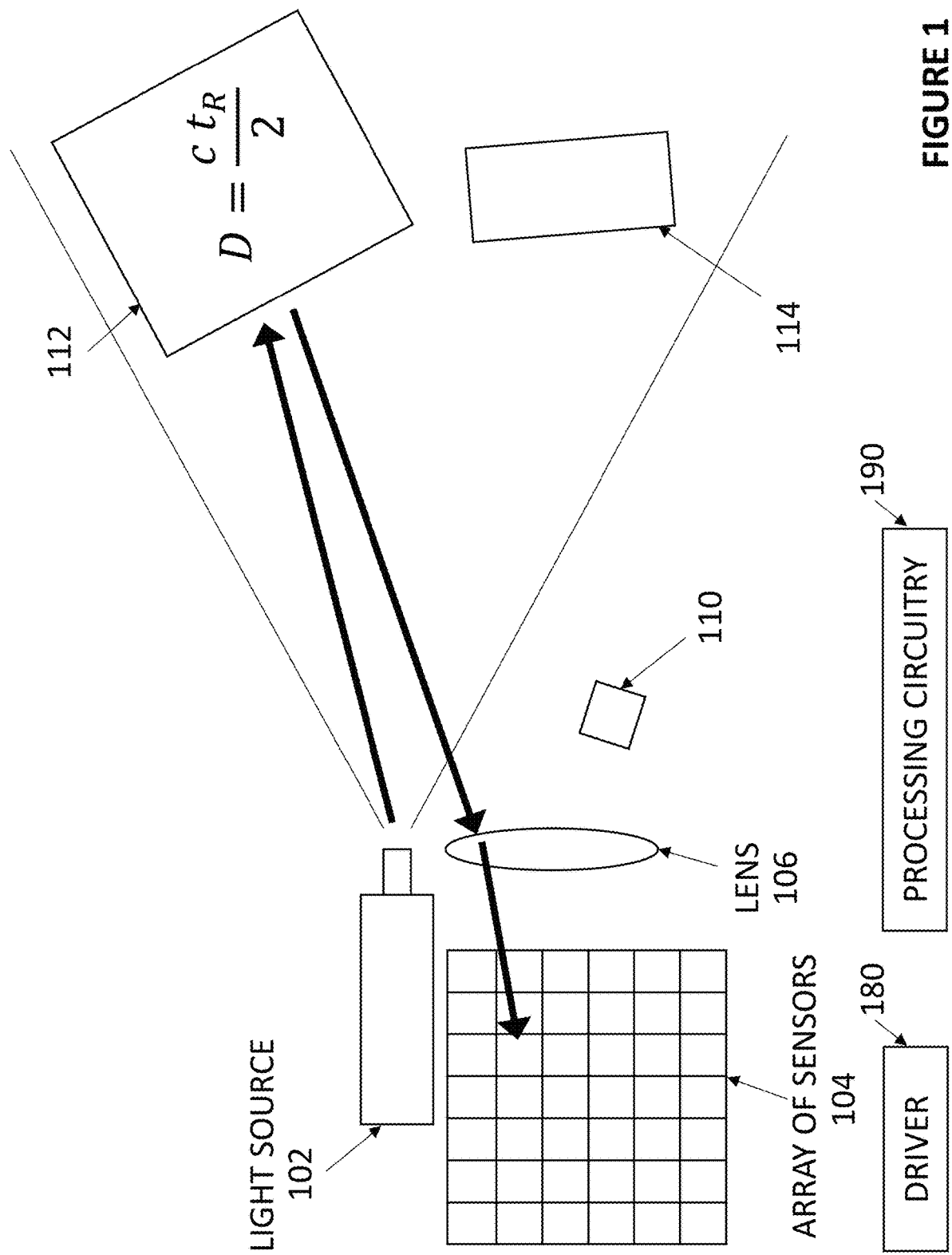
FIG. 1 illustrates a depth imager and time-of-flight operations, according to some embodiments of the disclosure.

FIG. 1 illustrates a depth imager and time-of-flight operations, according to some embodiments of the disclosure. The depth imager includes light source 102 for emitting light, array of sensors 104, and lens 106. The scene may have a plurality of objects, e.g., object 110, object 112, and object 114. The light source 102 can include one or more laser diodes. In some embodiments, the light source 102 includes light emitters such as vertical cavity surface-emitting lasers or edge-emitting lasers, in some cases, combined with a diffuser to affect the parts of the scene that the light emitters are sending are light to. The array of sensors 104 can include charge-coupled device (CCD) sensors or CMOS sensors arranged over a two-dimensional area. The sensors in the array of sensors 104 are referred to as pixels. The depth imager may include a driver 180 (e.g., electronic driving circuitry) for controlling and driving the light source 102 and the array of sensors 104. The depth imager may include processing circuitry 190 for receiving and processing signals from the array of sensors 104 to form depth estimates.

The emitted light bounces off the objects, and can return and hit the array of sensors 104. Besides the return light from the objects, the array of sensors 104 can further receive other extraneous light which may corrupt the time-of-flight measurement. One form of extraneous light is background (BG) light. BG light may come from other sources such as sunlight, other light sources not associated with the system, and light sources associated with other depth imagers. It is desirable to design time-of-flight depth imagers which have some tolerance for BG light.

Depth imagers can have an operating depth range defined by a minimum distance $D_{min}$ and a maximum distance $D_{max}$. Outside of the operating depth range, the depth imager does not report distance. One reason for $D_{min}$ not being zero could be that the return light for objects of a certain reflectivity closer than $D_{min}$ is so strong that the return light saturates the array of sensors 104. $D_{max}$ is typically the distance beyond which not enough light returns to the array of sensors 104 to determine the distance. In one example, suppose a depth imager has a minimum distance $D_{min}$ for its operating depth range, and the minimum time $t_{min}$ for light to travel to and back from the minimum distance $D_{min}$ is thus $$t_{min} = \frac{2D_{min}}{c}.$$

$D_{min}$ and $t_{min}$ can depend on the individual depth imager.

Figure 2:
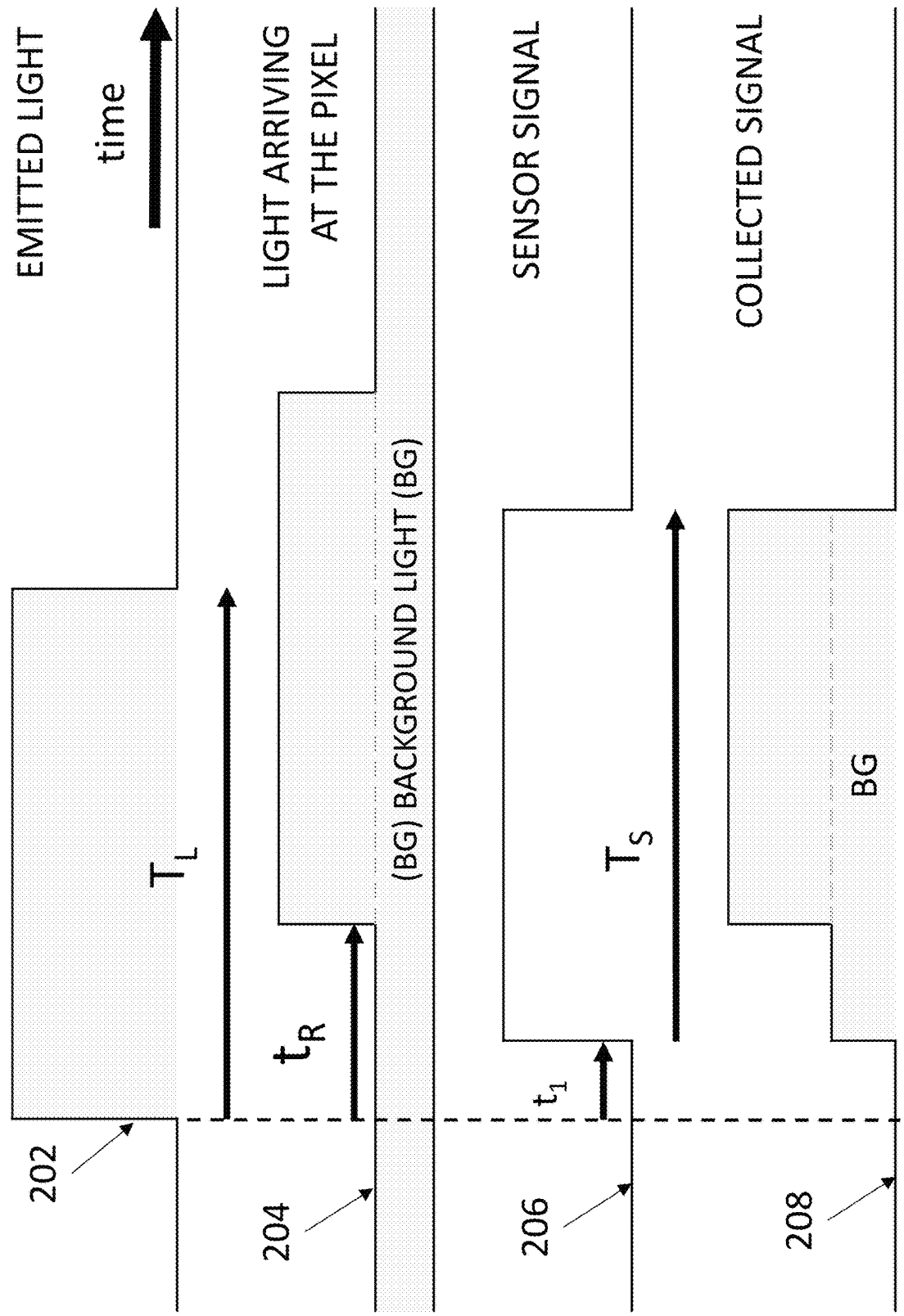
FIG. 2 illustrates an exemplary measurement that can be performed by a pixel in the array of sensors, according to some embodiments of the disclosure.

To obtain a depth for each pixel in the array of sensors 104, a set of measurements are carried out at each pixel. The set of measurements provide information to compute a depth. Each pixel can enable a respective depth to be computed or estimated; the array of sensors 104 can generate a depth image based on the respective depths. FIG. 2 illustrates a measurement that can be performed by a pixel in the array of sensors, according to some embodiments of the disclosure. A measurement can be defined by emitted light (e.g., plot 202), light arriving at the pixel (e.g., plot 204), sensor signal (e.g., plot 206), and collected signal (e.g., plot 208). Emitted light is dictated by when the light source (e.g., light source 102) is turned on and off. In the example shown, emitted light is turned on between times t=0 and t=$T_L$ (e.g., duration is $T_L$). The light source is off outside of the interval between times t=0 and t=$T_L$. The start time, when the emitted light is turned on, is set to be t=0 as a reference upon which time instants are defined. The light arriving at the pixel can include BG light (which is assumed to be slowly varying over the course of the measurement), and return light reflected from an object. The light reflected from an object can arrive at the pixel at t=$t_R$. The sensor signal dictates a time interval for the pixel to sense light arriving at the pixel. The sensor signal can define a period of integration for the pixel, where the pixel collects or accumulates charge based on photons of light arriving at the pixel. In the example shown, the pixel is sensing light between t=$t_1$ and t=$t_1$+$T_s$ (e.g., duration is $T_s$). In some cases, $t_1$=$t_{min}$. In some cases, $T_s$=$T_L$. The collected signal can include BG light and return light reflected from an object hitting the pixel during the period of integration. For simplicity, only one sensor signal is shown for controlling a pixel to make one measurement. In practice, a pixel can have multiple charge storage units for collecting multiple light measurements respectively, and thus multiple separate sensor signals can be used to control the charge storage units individually with different timings.

The notation for a measurement done by a pixel is M(X,Y,Z), where X specifies the time when the light source 102 turns off (or duration of emitted light from t=0), Y specifies the start time when the pixel begins sensing light, and Z specifies the duration of the time interval where the pixel is sensing light. The measurement illustrated in FIG. 2 is M($T_L$,$t_1$,$T_s$). Y can be negative, depending on the measurement.

To achieve accurate measurements, it is desirable to have precise control of the light source 102 and be capable of turning light source 102 on or off. For example, it is desirable to have driver 180 in the depth imager to be able to turn on the light source 102 at t=0 and turn off the light source at t=$T_L$. The driver 180 preferably can generate a signal to drive the light source 102 with sufficiently short rise and fall times.

Referring back to FIG. 2, the pixel can convert incoming photons into electrons and store those electrons in charge storage units. The charge storage units can be controlled individually with different sensor signals to achieve different sensor timings and make different measurements. The charge storage units for a given pixel are denoted as $S_i$ (i=0, . . . , N−1) where N is the number of charge storage units per pixel. For example, each pixel include one or more photodiodes (or photosensitive element) for sensing photons and converting the photons into electrons and one or more capacitors for storing the electrons, acting as charge storage unit(s). Sensor signals can start and stop the collection of electrons by the capacitors with specified timings. The series of capacitors can be considered as memory elements, i.e., charge storage units, which store different collected light measurements. To achieve accurate measurements, it is desirable to have precise control of the sensor signals, and be able to have the charge storage units start and stop sensing light at precise timings. The amount of charge stored in the charge storage units of a pixel can be read by processing circuitry 190 and processed by the processing circuitry 190 to compute depth.

In some cases, depth can be estimated from three light measurements collected by three charge storage units. The depth can be estimated based on a scheme that is tolerant to BG light. A pixel can include three charge storage units, $S_0$, $S_1$, and $S_2$, which can store different collected light measurements. The light source 102 can be on from times t=0 to t=$T_L$. $S_0$ can collect light from times t=$t_0$ to t=$t_0$+$T_L$. The measurement being made by $S_0$ is $M(T_L,t_0,T_L)$. $S_1$ can collect light from times $t=t_1$ to $t=t_1+T_L$. The measurement being made by $S_1$ is $M(T_L,t_1,T_L)$. In one case, $t_1=t_0+T_L$. $S_2$ can collect BG light for a time $T_L$ with the light source 102 off. $S_2$ can collect light from times $t=-t_2$ to $t=-t_2+T_L$. The measurement being made by $S_2$ is $M(T_L,-t_2,T_L)$. In one case, $t_2=T_L$, and thus $S_2$ can collect light from times $t=-t_2=-T_L$ to $t=0$. In another case, $S_2$ is $M(0,0,T_L)$, and the light source is kept off during the measurement, thus $S_2$ is only capturing BG light. Because the light source is not emitting light, the $S_2$ does not collect any reflected light. Generally speaking, the measurement $S_2$ collects BG light for a period of time before the light source is on. A depth D for the pixel can be obtained by computing the following exemplary equation:

$$D = D_{min} + \frac{c\, t_R}{2} \frac{S_1 - S_2}{S_0 - S_2 + S_1 - S_2} \quad \text{(eq. 2)}$$

which is obtained when $t_1=t_0+T_S$, $$D_{min} = 2\frac{t_0}{c}.$$

Equation (2) is obtained when the durations of the time interval where the pixel is sensing light for the three charge storage is the same $T_L$ for all three measurements, which need not be the case in general.

The collected light by $S_0$ and $S_1$ are individually adjusted for BG light by subtracting the BG light collected by $S_2$. The depth is computed based on the ratio of collected light by $S_1$ over the total amount of collected light by $S_0$ and $S_1$, after the adjustment for BG light $S_2$ is performed. Accordingly, the depth D computed with equation (2) and the described measurements has the advantage of being tolerant/insensitive to background light, since $S_2$ measuring BG light is subtracted from the measurements done by $S_0$ and $S_1$.

Measurements made by charge storage units $S_0$, $S_1$, and $S_2$ can be repeated a plurality of times and the collected light can be added/accumulated in the respective charge storage units (or in other circuitry) to increase signal strength. The added repeated measurements in a charge storage unit can be used for the depth calculation. If the number of repetitions is different for each charge storage unit, which can be advantageous in some cases to increase the signal-to-noise ratio, the values in the storage units may be divided by the number of repetitions, and the resulting values can be used for depth estimation.

The charge storage units can perform the addition or accumulation of repeated measurements in hardware, using suitable sensor signals. The same charge storage unit can be turned on multiple times with an appropriate sensor signal to make multiple measurements without dumping the electrons or resetting the charge storage unit in between the measurements. As the measurements are repeated, the electrons continue to be added/accumulated in the same charge storage unit.

Figure 3:
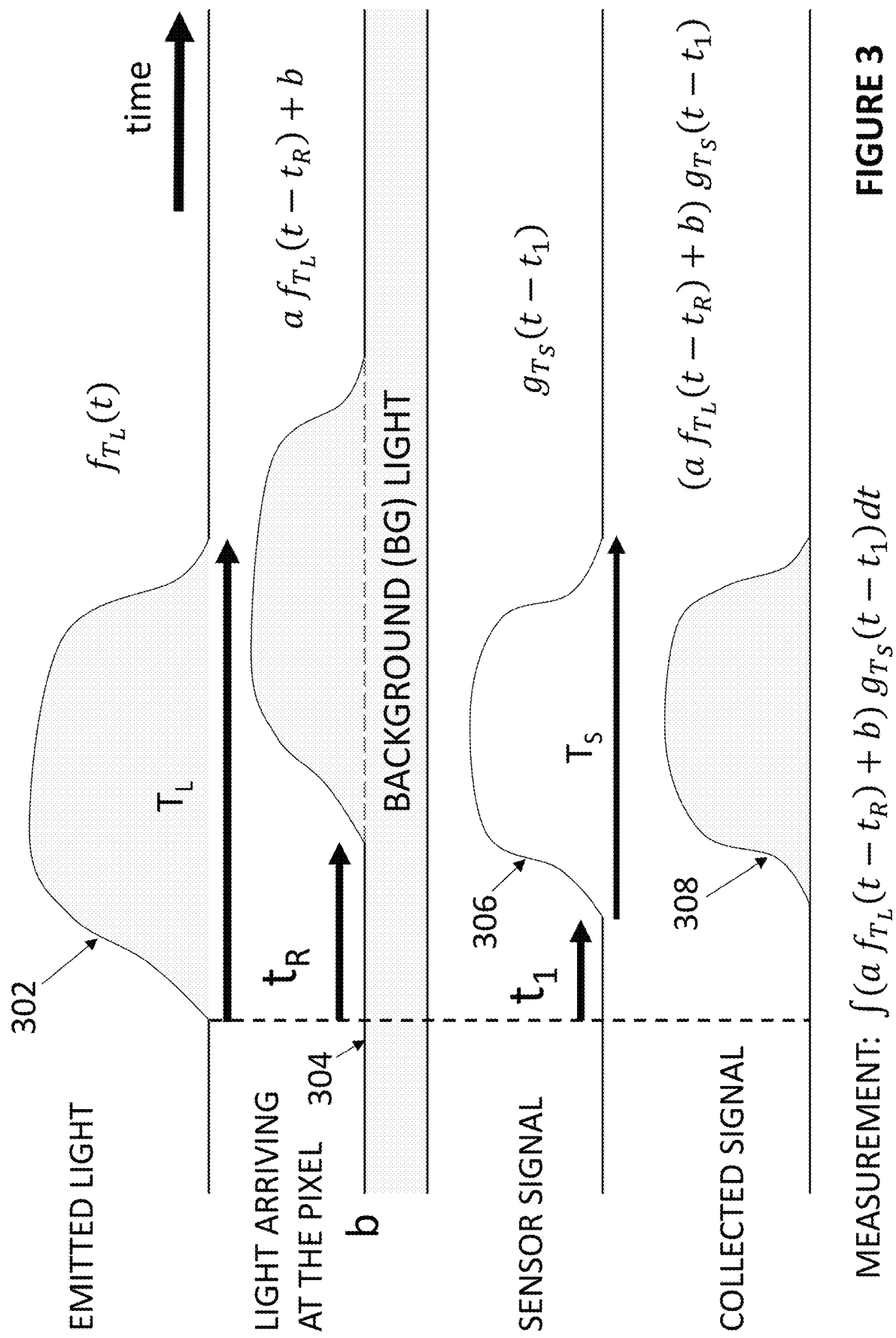
FIG. 3 illustrates an exemplary measurement that can be performed by a pixel in the array of sensors, according to some embodiments of the disclosure.

Referring back to FIG. 2, the plots shown have ideal/perfect square pulses, and the computation in equation (2) assumes the light source 102 is turned on with fast (zero) rise time and off with fast (zero) fall time and the charge storage unit is either completely off or completely on. In practice, due to electronics hardware limitations on actual rise and fall times of signals and sensor sensitivities, the plot 202 for emitted light and plot 206 for sensor signal are likely to not have perfect square pulse shapes. FIG. 3 illustrates an exemplary measurement that can be performed by a pixel in the array of sensors, according to some embodiments of the disclosure. The emitted light (e.g., plot 302) by the light source 102 has an intensity which can vary depending on time. This is due to the physical limitations of the light source 102 as well as the limited rise and fall times of the signal driving the light source 102. The emitted light is represented as $f_{T_L}(t)$, which is output power as a function of time. $T_L$ is the amount of time the light source 102 is on. The light arriving at the pixel (e.g., plot 304), which is in part a result of the emitted light, would also have a similar shape as the emitted light. The light arriving at the pixel is represented as a $f_{T_L}(t-t_R)+b$, where a is a gain factor to account for the reduction in light returning to the pixel (e.g., reduction in amplitude), b is the amount of BG light (e.g., constant over time), and $t_R$ is the amount of time for the light to travel to and from the object in the scene. The sensor signal (e.g., plot 306) can also have time varying photon conversion efficiency (e.g., number of electrons collected per incoming photon) and the sensor signal may also have limited rise and fall times. Photon conversion efficiency can increase with the strength of the sensor signal. The sensor signal (e.g., representing its photon conversion efficiency as a function of time) is represented by $g_{T_S}(t-t_1)$, where $t_1$ is the time when a charge storage unit starts to turn on and $T_S$ is an amount of time that the charge storage unit is on. The collected signal (e.g., plot 208), which is a result of the light arriving at the pixel and the sensor signal, would also have a non-ideal shape. A collected signal as a function of time is represented by (a $f_{T_L}(t-t_R)+b)\, g_{T_S}(t-t_1)$, which is a combination of the function representing light arriving at the pixel and the function representing the sensor signal. Accordingly, the measurement representing a number of collected electrons is the integral of the collected signal: $\int (a\, f_{T_L}(t-t_R)+b)\, g_{T_S}(t-t_1)dt$.

Figure 4:
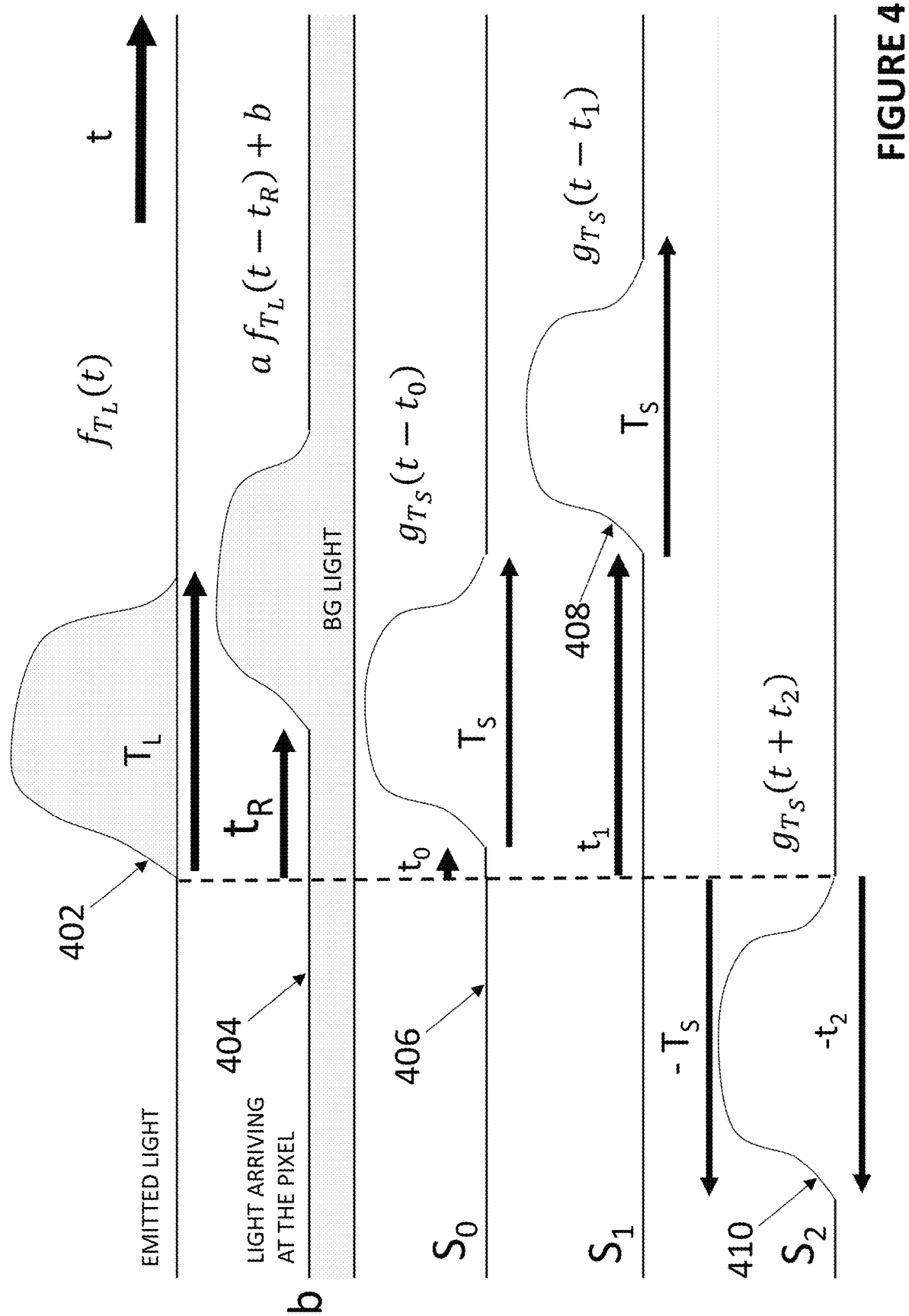
FIG. 4 illustrates exemplary measurements that can be performed by a pixel in the array of sensors, accounting for background light, according to some embodiments of the disclosure.

FIG. 4 illustrates exemplary measurements that can be performed by a pixel in the array of sensors, accounting for background light, according to some embodiments of the disclosure. As discussed previously, it is possible to take three measurements with charge storage units $S_0$, $S_1$, and $S_2$ to subtract out the BG light in the measurements when performing depth estimation. The emitted light (e.g., plot 402) by the light source 102 is represented as $f_{T_L}(t)$. $T_L$ is the amount of time the light source 102 is on. The light arriving at the pixel (e.g., plot 404) is represented as a $f_{T_L}(t-t_R)+b$. Three sensor signals are used to make three measurements with three charge storage units $S_0$, $S_1$, and $S_2$.

$S_0$ is controlled by sensor signal (e.g., plot 406), which is represented by $g_{T_S}(t-t_0)$, where $t_0$ is the time when the charge storage unit starts to turn on and $T_S$ is an amount of time that the charge storage unit is on. The measurement made by $S_0$ is $M(T_L,t_0,T_S)$. The collected signal for $S_0$ can be represented by (a $f_{T_L}(t-t_R)+b)\, g_{T_S}(t-t_0)$. A measurement by $S_0$ representing a number of collected electrons is the integral of the collected signal: $\int (a\, f_{T_L}(t-t_R)+b)\, g_{T_S}(t-t_0)dt$.

$S_1$ is controlled by sensor signal (e.g., plot 408), which is represented by $g_{T_S}(t-t_1)$, where $t_1$ is the time when the charge storage unit starts to turn on and $T_S$ is an amount of time that the charge storage unit is on. The measurement made by $S_1$ is $M(T_L,t_1,T_S)$. The collected signal for $S_1$ can be represented by (a $f_{T_L}(t-t_R)+b)\, g_{T_S}(t-t_1)$. $S_1$ can collect light from times $t=t_1$ to $t=t_1+T_S$. A measurement representing a number of collected electrons is the integral of the collected signal: $\int (a\, f_{T_L}(t-t_R)+b)\, g_S(t-t_1)dt$. In one case, $t=t_0+T_S$. In some cases $t_1$ is slightly less than $t_0+T_S$ by a predefined amount to allow for some overlap of the two time intervals.

The overlapping can be particularly advantageous when the pulse shapes are not ideal. In some cases, the sensor signal for making measurement $S_1$ may have relatively small values close to the edges of the time interval during which the pulse is non-zero, such that a part of the measurement $S_1$ is small and therefore noisy. In such cases, changing the start time of $t_1$ to be slightly less than $t_0+T_S$ by a predefined amount may increase the return signal and therefore the signal-to-noise ratio over a range of depth that is of interest.

$S_2$ can collect BG light for a time $T_S$ with the light source 102 off. $S_2$ sensor signal (e.g., plot 410) is represented by $g_{T_S}(t+t_2)$, where $-t_2$ is the time when the charge storage unit starts to turn on and $T_S$ is an amount of time that the charge storage unit is on. The measurement made by $S_2$ is $M(T_L, -t_2, T_S)$. $S_2$ can collect light from times $t=-t_2$ to $t=-t_2+T_S$. The collected signal for $S_2$ can be represented by $b\, g_{T_S}(t+t_2)$. A measurement representing a number of collected electrons is the integral of the collected signal: $\int b\, g_{T_S}(t+t_2)dt$. In one case, $t_2=T_S$, and thus $S_2$ can collect light from times $t=-t_2=-T_S$ to $t=0$.

The charge storage units do not all necessarily turn on for the same amount of time $T_S$, and the durations can differ from each other. In some cases, one or more of the durations $T_S$ can equal to $T_L$. Before computing a ratio for the depth estimation, the measurement by $S_2$ is subtracted from $S_0$ and $S_1$ to remove the contribution from BG light to the measurements. If $S_0$ and $S_1$ are controlled by sensor signals that do not have the same pulse shape, which in some cases may be the case if they are not pulses of the same width, then the amount of background light they capture may differ, in which case $S_2$ may be multiplied by a factor which is different for $S_0$ and $S_1$ respectively, and subsequently subtracted from $S_0$ and $S_1$ respectively to subtract the correct amount of background light.

To take into account that the plots do not have perfect square pulses and obtain accurate depth estimates, it is possible to measure the ratio $$\frac{S_1 - S_2}{S_0 - S_2 + S_1 - S_2}$$

as a function of depth and store the values in a lookup table. Different values of the ratio serves as the index of the lookup table. The lookup table implements a function $H(x)$ such that $$H\left(\frac{S_1 - S_2}{S_0 - S_2 + S_1 - S_2}\right) = D$$

and allows the estimated depth to be adjusted for the non-ideal pulse shapes. In other words, the result from the lookup table based on the ratio $$\frac{S_1 - S_2}{S_0 - S_2 + S_1 - S_2}$$

can output a corrected depth estimate. Values for $H(x)$ can be extrapolated between the values of $x$ for which $H(x)$ is known. The depth equation becomes:

$$D = H\left(\frac{S_1 - S_2}{S_0 - S_2 + S_1 - S_2}\right) \quad \text{(eq. 3)}$$

Internal Reflections Corrupt the Measurements

One of the issues with time-of-flight imagers is the following: the assumption is that each pixel receives light only from the part of the scene that corresponds to its field of view. Phrased differently, the assumption is that each pixel captures light from objects within its field of view. All the light that enters the lens from objects in its field of view are focused onto that pixel alone. However, if light from an object somewhere else in the scene undergoes multiple internal scattering events or multiple internal reflections, then this light can end up hitting a pixel whose field of view it is not in. Accordingly, it is possible for light from one part of the scene to corrupt measurements from pixels whose field of view corresponds to a different part of the scene.

This means that, besides BG light, the light arriving at a pixel can include other extraneous light, such as light due to internal scattering events or multiple internal reflections. This light, i.e., a corrupting light or extraneous light, can significantly impact the depth estimate of the pixel that the light ends up hitting. This effect can be strong for objects nearby the camera, where the amount of light hitting the sensor is large. For a handheld device, fingers or other parts of a hand can be very close to the camera (unintentionally), where the effect can be strong. In a scenario where a pixel's field of view is pointing at a faraway object, and in another part of the scene outside of the pixel's field of view is an object very close to the array of sensors 104, the effect can be pronounced. The amount of light returning to the sensor can decay quadratically with distance, i.e., the light hitting a pixel whose field of view is a given object is proportional to $1/D^2$ where D is the distance to the object. Therefore, the nearby object may lead to a large amount of light coming back to the sensor relative to light returning from the faraway object. Since the amount of signal from the faraway object is relatively low in comparison, the corrupting light could significantly impact the depth estimate. Multiple internal reflections can lead to an object corrupting many or all of the pixels in the sensor.

Note that this internal reflections problem is not the same as the multipath problem, where the reflections are from multiple objects in the scene that may be centimeters or meters away from each other. The internal reflection problem is quite a different challenge from the multipath problem because the assumed reflections can happen at much closer distances (within centi- or milli-meters) to the depth imager. This difference makes most approaches for the multipath problem impractical for addressing internal reflections, in some cases, those approaches can potentially requiring far more measurements than the methods described herein.

Figure 5:
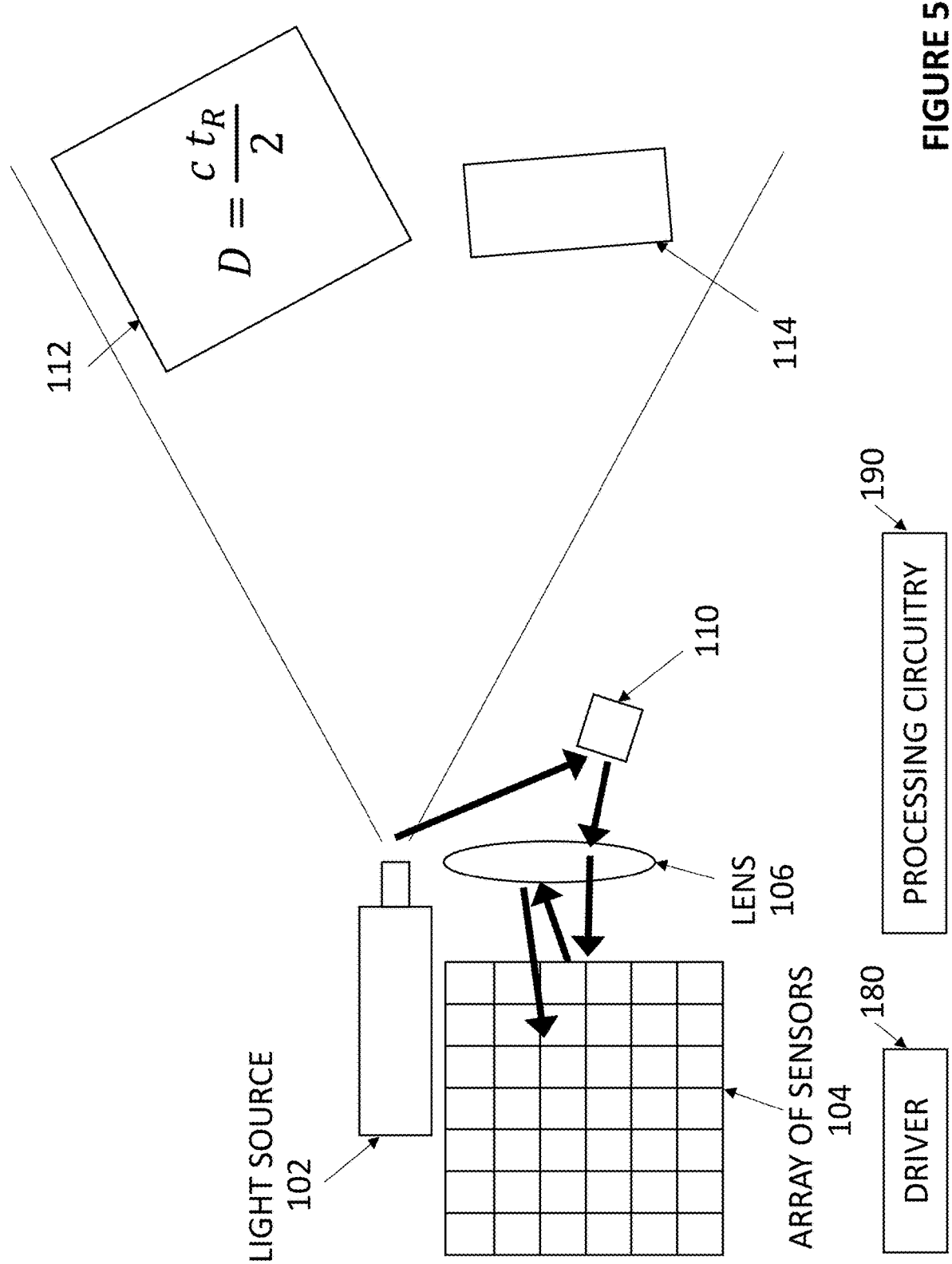
FIGS. 5-7 illustrate different scenarios for extraneous sources of light hitting a pixel, according to some embodiments of the disclosure.
Figure 6:
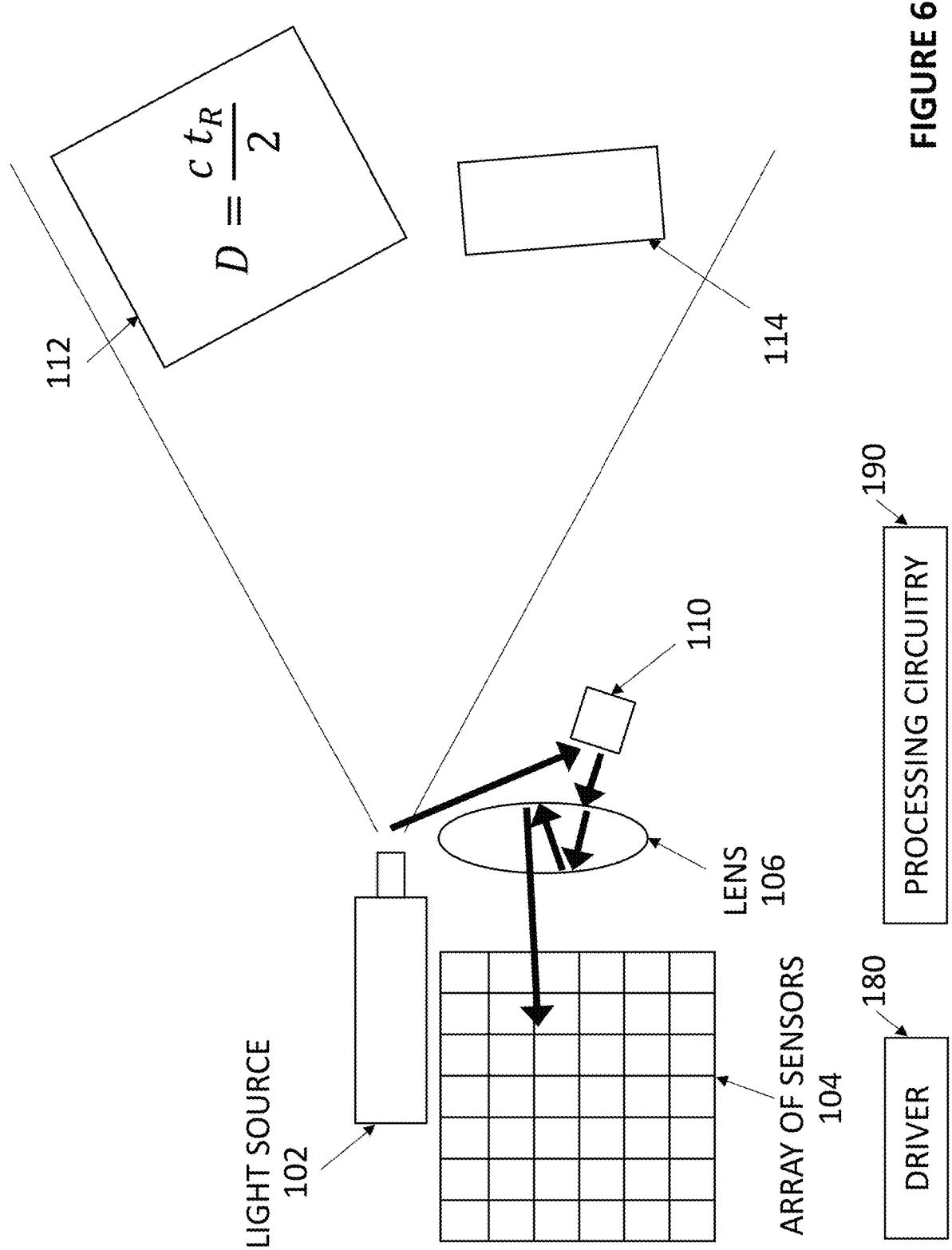
Figure 7:
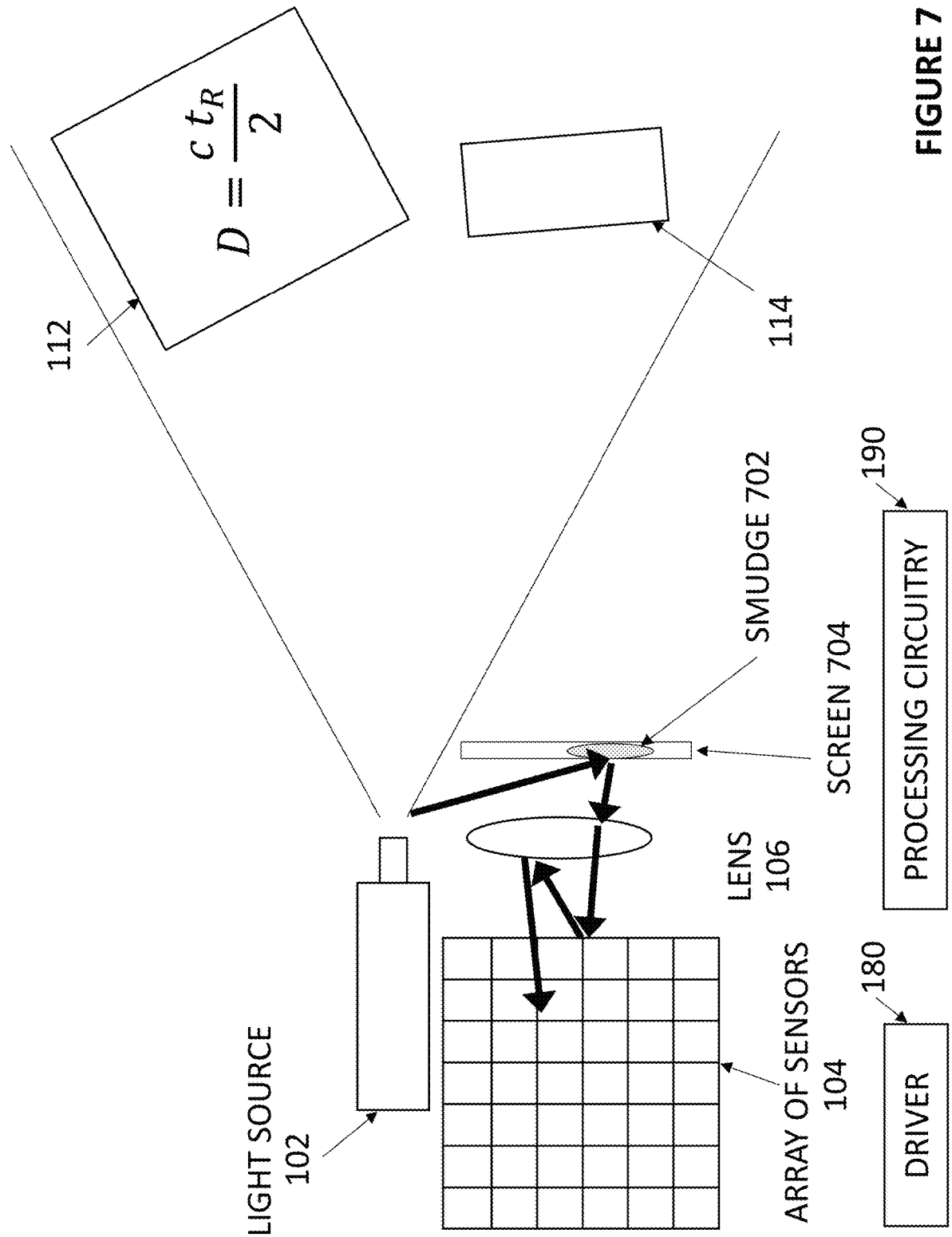

FIGS. 5-7 illustrate exemplary scenarios for extraneous sources of light hitting a pixel, according to some embodiments of the disclosure. In FIG. 5, it can be seen that light reflecting off a nearby object 110 undergoes multiple bounces between the lens 106 and the array of sensors 104. The light can go past the lens, bounces off the array of sensors 104, bounces off the lens, and hits the array of sensors 104 on a different pixel. In FIG. 6, it can be seen that light reflecting off a nearby object 110 (e.g., an object outside of the field of view of the pixel) undergoes multiple bounces inside the lens 106. In some depth imagers, careful optical design (e.g., using a set of lenses and antireflective coating) could mitigate the issue, but it can be challenging to completely remove the effect.

In FIG. 7, it can be seen that the light can reflect off a smudge 702 on a screen 704. The smudge 702 can be an oil film or residue left on a screen 704 that is protecting the lens. This scenario can be common for handheld devices having a depth imager. The smudge 702 is just one example of undesirable material on screen 704. Other undesirable materials which can cause internal reflections can include dust and condensation. For instance, when there is dust close to the sensor, due to blurring of nearby objects, the dust can cause big disks to appear in the depth image (e.g., a system may interpret that there are big disks in the scene).

It is advantageous to ensure that the corrupting light from internal reflections does not affect the depth estimates.

Separately Measure Corrupting Light and Remove its Impact on the Depth Estimation As discussed previously the internal reflection problem is most serious when there are objects close to the sensor. Such nearby objects are closer than a distance $D_{IR}$ (IR stands for internal reflection). $D_{IR}$ can be on the order of centimeters. Typically, the minimum distance $D_{min}$ of the operational range of the depth imager is larger than $D_{IR}$.

Figure 8:
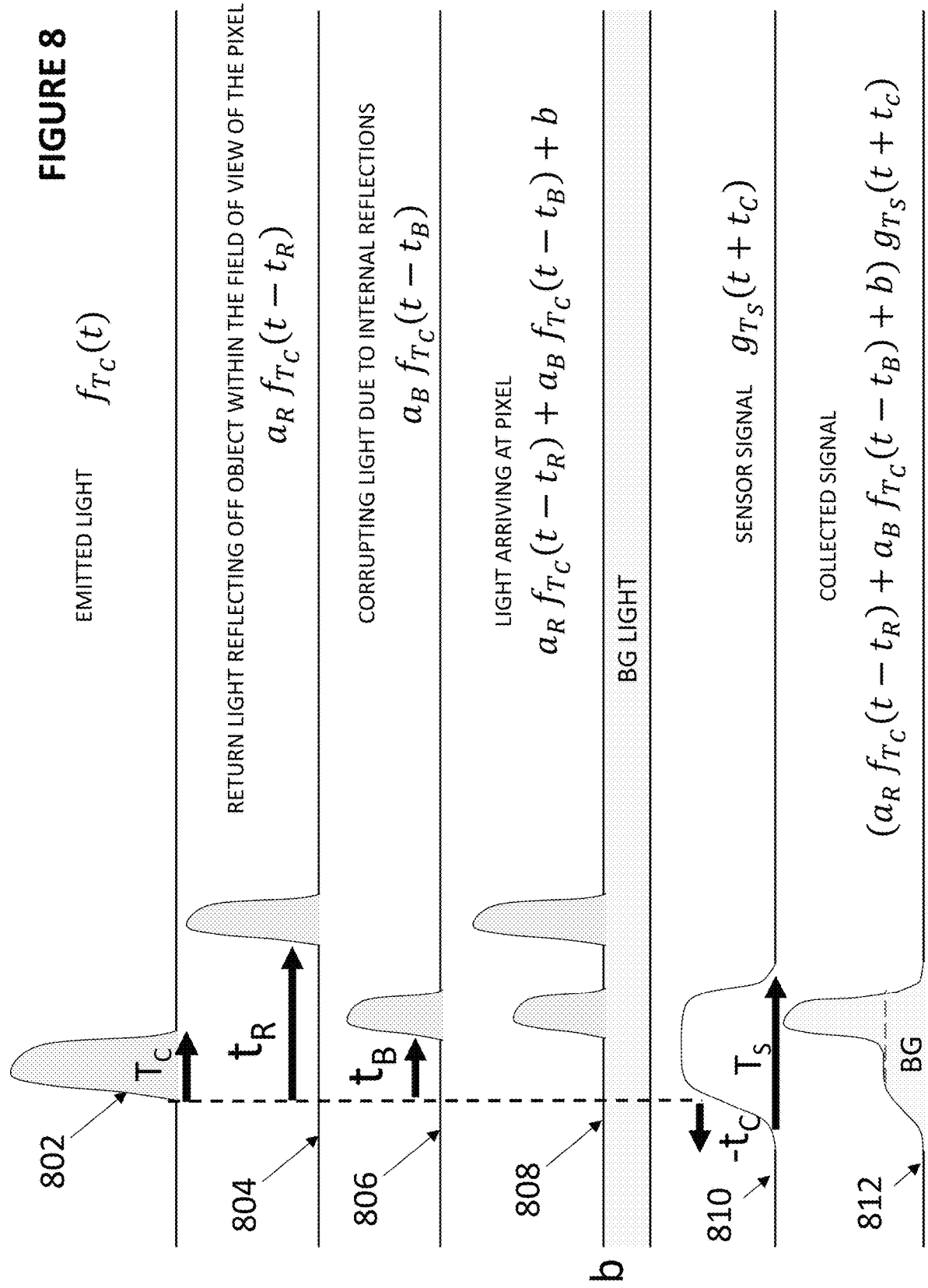
FIG. 8 illustrates a technique for isolating and measuring the corrupting light, according to some embodiments of the disclosure.

One technique for making sure that the corrupting light does not affect the depth calculation is to separately measure the corrupting light and removing its impact or contribution to the depth estimation. FIG. 8 illustrates a technique for isolating and measuring the corrupting light, according to some embodiments of the disclosure. For instance, it is possible to make the width or duration of the emitted light $T_L$ short enough so that the light from the corrupting object outside of the field of view of the pixel and reflected light from the object or objects within the field of view of the pixel are separated in time. A charge storage unit of a pixel can then be controlled to sense and collect light during the time period when the charge storage unit is expected to capture BG light and the corrupting light, and no reflected light from object(s) within the field of view of the pixel. Once the measurement of BG light and the corrupting light is made, it is possible to apply an appropriate gain factor and subtract the measurement of BG light and the corrupting light from other measurements that are affected by the corrupting light.

The emitted light (e.g., plot 802) by light source 102 is represented by $f_{T_C}(t)$. $T_C$ is the amount of time the light source 102 is on, and $T_C$ is short enough to temporally separate the return light reflecting off object or objects within the field of view of the pixel and the corrupting light. Return light reflecting off object (e.g., plot 804) within the field of view of the pixel is represented by $a_R f_{T_C}(t-t_R)$, where $a_R$ is a gain factor to account for the reduction in light returning to the pixel (e.g., reduction in amplitude) and $t_R$ is the amount of time for the light to travel to and from the object or objects within the field of view. Corrupting light due to internal reflections (e.g., plot 806) is represented by $a_B f_{T_C}(t-t_B)$, where $a_B$ is a gain factor to account for the reduction in light returning to the pixel (e.g., reduction in amplitude) and $t_B$ is the amount of time for the light return to the pixel after one or more internal reflection(s). One can see that the return light from the object and the corrupting light do not overlap in time. Light arriving at the pixel (e.g., plot 808) is represented as $a_R f_{T_C}(t-t_R)+a_B f_{T_C}(t-t_B)+b$, which is a combination of the return light reflecting off object, the corrupting light, and BG light (represented by b). A charge storage unit can be controlled by sensor signal (e.g., plot 810), to start sensing light at $-t_c$ and for a duration of $T_S$. The sensor signal is represented by $g_{T_S}(t+t_C)$. The measurement by the charge storage unit is $F=M(T_C,-t_C,T_S)$. In one case, $T_S=t_c+t_{min}$, and accordingly the measurement is $M(T_C,-t_C, t_C+t_{min})$. In another case, $t_C<T_S<t_c+t_{min}$ but $T_S$ is chosen large enough to collect all the light due to internal reflections, assuming some maximum distance between nearby objects leading to corrupting light and the sensor. If $D_{C,max}$ is the maximum distance between the sensor and objects leading to corrupting light, then $T_S$ may be chosen to be larger than $$t_C + \frac{2D_{C,max}}{c}.$$

The collected signal (e.g., plot 812), which is a result of the corrupting light and BG light, is represented by $(a_R f_{T_C}(t-t_R)+a_B f_{T_C}(t-t_B)+b) g_{T_S}(t+t_c)$. The function $(a_R f_{T_C}(t-t_R)+a_B f_{T_C}(t-t_B)+b) g_{T_S}(t+t_c)$ is a combination of the function representing light arriving at the pixel and the function representing the sensor signal. Accordingly, the measurement representing a number of collected electrons is the integral of the collected signal: $\int (a_R f_{T_C}(t-t_R)+a_B f_{T_C}(t-t_B)+b) g_{T_S}(t+t_c)dt$. This measurement (which is referred herein as F and can be denoted as $M(T_C,-t_C,T_S)$) can include a contribution from BG light b (referred herein as BG), a contribution from corrupting light $a_B f_{T_C}(t-t_B)$ due to internal reflections (referred herein as corrupting light C), and a contribution $f a_R f_{T_C}(t-t_R) g_{T_S}(t+t_c)dt$ from the return light reflecting off the object or objects within the field of view of the pixel, which may be zero or small if the sensor signal shuts off before light returning from the object or objects within the field of view of the pixel starts to hit the pixel. The contribution to the measurement solely from the corrupting light is equal to $f a_B f_{T_C}(t-t_B) g_{T_S}(t+t_c)dt$. If the contribution from the object or objects within the field of view can be ignored, then the measurement becomes of the form F=C+BG, where BG=$\int b g_{T_S}(t+t_c)dt$ is the contribution from the background light. If a measurement for BG light is made separately, it is possible to subtract or remove the contribution from BG light from the measurement F (e.g., F−BG=C) to obtain corrupting light C.

A given measurement M, depending on its parameters, can have a certain contribution due to corrupting light: $\alpha_F C$ (the contribution is C multiplied by a gain factor $\alpha_F$). Fortunately, the impact/contribution from the corrupting light $\alpha_F C$ can be removed by subtracting the measurement M by $\alpha_F C$. C can be derived by the technique illustrated in FIG. 8, e.g., through making measurement F and removing the contribution from BG light from F. The gain factor $\alpha_F$ for corrupting light can be determined a priori by knowing the shapes of the light pulse and the sensor signal, and can depend weakly on distance, or the distance to the corrupting object may be known a priori as in case of smudge on a screen at a fixed distance from the sensor. As a result, the quantity M−$\alpha_F C$ would be substantially independent from the corrupting light.

Determining the gain factor $\alpha_F$ corresponding to the corrupting light C is not trivial. For example, if the light source pulse and the sensor signal pulse are perfectly square, then the amount of corrupting light in a given measurement M would be proportional to the amount of time that M is collecting corrupting light. For example if $M(T_L,0,T_S)$ and $T_L<T_S$ then $M(T_L,0,T_S)$ can collect corrupting light from time $$\frac{2D_C}{c}$$

to $T_L$ where $D_c$ is the distance between the corrupting object and the sensor. If $$\frac{2D_C}{c}$$

is negligible compared to $T_L$, then the amount of corrupting light in a given measurement M is approximately proportional to $T_L$.

Referring back to FIG. 8, the amount of time corrupted light is being captured by C is $T_C$ (which is also the duration of the emitted light used for the measurement illustrated in FIG. 8, $M(T_C,-t_C,T_S)$). Therefore, if the gain factor $\alpha_F$ is set to a ratio of the duration of the emitted light used for a given measurement $M(T_L,0,T_S)$ and a duration of the emitted light used in the measurement $M(T_C,-t_C,T_S)$ illustrated by FIG. 8, $$\frac{T_L}{T_C},$$

then the quantity $M-\alpha_F C$ would be a quantity in sensitive to corrupting light, if the pulses were perfectly square. The ratio effectively finds a gain factor $\alpha_F$ that accounts for the contribution from the corrupting light captured in a given measurement M relative to the amount of corrupting light captured in C. The gain factor $\alpha_F$ is thus a multiplier multiplying the amount of corrupting light captured in C, and the result of the multiplication yields an approximation of the amount of corrupting light captured in a given measurement $M(T_L,0,T_S)$. If the pulses are not perfectly square the quantity $M-\alpha_F C$ may, to some satisfactory level of accuracy, still be approximately insensitive to corrupting light, for an appropriately chosen gain factor $\alpha_F$. If $f_{C,M}$ is the amount of corrupting light collected by a given measurement M, and $f_C$ is the amount of corrupting light collected by F (as illustrated by the scheme seen in FIG. 8), then choosing $\alpha_F$ equal to the ratio $$\frac{f_{C,M}}{f_C}$$

would lead to $M-\alpha_F C$ being insensitive to corrupting light.

It is possible to use the measurement illustrated in FIG. 8 and derivation for C to remove the impact of corrupting light (e.g., $M-\alpha_F C$) from the measurements illustrated by FIG. 4. Referring back to the example illustrated by FIG. 4, $S_0$ is $M(T_L,t_0,T_S)$, $S_1$ is $M(T_L,t_1,T_S)$, and $S_2$ is $M(T_L,-t_2,T_S)$. $S_0$ is likely to be the measurement most affected by corrupting light. The gain factor $\alpha_F$ can be determined, and C can be derived using the example illustrated in FIG. 8. $S_0$ can be subtracted by the $\alpha_F C$ to make $S_0$ insensitive to corrupting light.

If there is no BG light (BG=0), then the measurement F includes the corrupting light due to internal reflections only (e.g., F=C+BG=C+0=C). $S_0$ can be adjusted by computing $S_0'=S_0-\alpha_F F=S_0-\alpha_F C$. The measurement by $S_0$ is subtracted by F=C multiplied by a gain factor $\alpha_F$ for the corrupting light. The resulting quantity $S_0'$ can be insensitive to corrupting light. Measurement by $S_1$ can be less affected by corrupting light, and adjustment for the corrupting light may not be necessary to reach a satisfactory degree of accuracy. When the measurements are applied to equation (2) or equation (3), $S_0'$ replaces $S_0$. The equation can be applied in the same manner without further adjustments, if there is no BG light.

The depth estimation calculation can be different, if there is BG light (BG≠0). When there is BG light, then measurement F is a combination of corrupting light C and BG light BG, e.g., F=C+BG. To obtain a measurement $S_i$ that is insensitive to corrupting light C and BG light, the measurement $S_i$ can remove contribution from the corrupting light $\alpha_F C$ and BG light $S_2$ through subtraction: $S_i-\alpha_{F,i}C-S_2$. This setup ensures that the corrupting light due to internal reflections is removed once (through $-\alpha_{F,i}C$) and the BG light is removed once (through $-S_2$). Plugging in equation C=F-BG, and assuming BG=$S_2$, $S_1-\alpha_{F,i}C-S_2$ can be rewritten as $S_i-\alpha_{F,i}C-S_2=S_i-\alpha_{F,i}(F-BG)-S_2=S_1-\alpha_{F,i}(F-S_2)-S_2=S_1-\alpha_{F,i}F+\alpha_{F,i}S_2-S_2=S_i-\alpha_{F,i}F+(\alpha_{F,i}-1)S_2$. Equation (3) with $S_0$ adjusted for corrupting light and BG light can become the following, where $S_0-\alpha_{F,i}F+(\alpha_{F,i}-1)S_2$ replaces $S_0-S_2$:

$$D = H\left(\frac{S_1 - S_2}{[S_0 - \alpha_{F,0}F + (\alpha_{F,0} - 1)S_2] + S_1 - S_2}\right) \quad (\text{eq. 4})$$

This adjusted ratio $$\frac{S_1 - S_2}{[S_0 - \alpha_{F,0}F + (\alpha_{F,0} - 1)S_2] + S_1 - S_2}$$

for depth calculation can grow with depth, and can be provided as input to a lookup table implementing H(x) to obtain an actual depth D.

More generally, for different depth estimation equations and techniques for measuring light, some contribution by the corrupting light measurement $\alpha_{F,i}F$ can be subtracted from a measurement made by a given charge storage unit $S_i$, as seen in $S_i-\alpha_{F,i}F+(\alpha_{F,i}-1)S_2$. The adjusted measurement St is thus equal to $S_i-\alpha_{F,i}F+(\alpha_{F,i}-1)S_2$, where the corrupting light measurement F multiplied by a gain factor $\alpha_{F,i}$ is subtracted from the original measurement S and background measurement $S_2$ multiplied by a gain factor $(\alpha_{F,i}-1)$ is added to the original measurement $S_i$. A specific gain factor $\alpha_{F,i}$ for the corrupting light corresponding to the measurement can be determined and used. For example, it can be determined that the amount of corrupting light in $S_i$ is equal to $f_{c,i}$ and the amount of corrupting light in F is equal to $f_C$, in which case $$\alpha_{F,i} = \frac{f_{C,i}}{f_C}.$$

For measurement $S_0$, the gain factor $\alpha_{F,0}$, can thus be a ratio between the amount of corrupting light captured in $S_0$ and an amount of corrupting light captured in measurement F. For measurement $S_1$, the gain factor $\alpha_{F,1}$, can thus be a ratio between the amount of corrupting light captured in $S_1$ and an amount of corrupting light captured in measurement F. When the measurements are applied to equation (2) or equation (3), $S_i'$ replaces $S_i-S_2$ for measurements which can be impacted by a component of the corrupting light. Measurement $S_i'$ is uncorrupted by the corrupting light and BG light and can be used directly in a depth estimation equation, such as equation (3).

To compute the depth equation seen in equation 4, it is possible to utilize one charge storage unit for $S_0$, one charge storage unit for $S_1$, one charge storage unit for $S_2$, and one charge storage unit for F. In other words, the technique illustrated by FIG. 8 in combination with the measurements seen in FIG. 4 may utilize one additional charge storage unit to make the corrupting light measurement F.

In some embodiments, both the measurement $S_0$ and the measurement $S_1$ are impacted by some amount of corrupting light. Accordingly, both the measurement $S_0$ and the measurement $S_1$ are adjusted for both corrupting light and background light. In other words, in equation (3), $S_0'$ replaces $S_0-S_2$, and $S_1'$ replaces $S_1-S_2$.

In some embodiments, the start time of the measurement $S_1$, i.e., $t_1$, is set to begin collecting charge when no more corrupting light is hitting the pixel (or is expected to hit the pixel). Accordingly, the measurement $S_0$ is impacted by corrupting light and background light, and the measurement $S_1$ is impacted by background light and not by corrupting light. Accordingly, the measurement $S_0$ is adjusted for both corrupting light and background light, and the measurement $S_1$ is adjusted only for background light. In other words, in equation (3), $S_0'$ replaces $S_0-S_2$, and $S_1-S_2$ stays as $S_1-S_2$. Note that the gain factor $\alpha_{F,1}$ in $S_1'$, which is a ratio between the amount of corrupting light captured in $S_1$ and an amount of corrupting light captured in measurement F, is zero if no amount of corrupting light is captured in $S_1$, which effectively makes $S_1'=S_1-\alpha_{F,1}F+(\alpha_{F,1}-1)S_2=S_1-0*F+(0-1)S_2=S_1-S_2$.

To Avoid Having to Add Additional Charge Storage Units to the Hardware for Measuring the Corrupting Light In some cases, it is possible to avoid the need to have an additional charge storage unit. Note that $[S_i-\alpha_{F,i}F+(\alpha_{F,i}-1)S_2]$ (a quantity seen in equation (4)) can be rewritten as $(S_i+(\alpha_{F,i}-1)S_2)-\alpha_{F,i}F$. Assuming $\alpha_{F,i}-1>0$, it is possible to perform the measurement $(S_i+(\alpha_{F,i}-1)S_2)$ in hardware. As mentioned previously, the charge storage units in a pixel can be controlled to make and accumulate multiple measurements performed over time. In some cases, the measurements can be repeated based on different light pulse widths of the light source 102 and/or different sensor signal pulse widths/durations using a same charge storage unit. Specifically, the same charge storage unit can perform the addition of measurements, by letting the same charge storage unit continue to collect and accumulate electrons (e.g., an amount of charge) for all the measurements, and not reset the charge storage unit after each measurement).

A same charge storage unit can be used to make a measurement corresponding to $S_i$ and the measurement is stored in the charge storage unit. The same charge storage unit can make the BG measurement $S_2$, $\alpha_{F,i}-1$ number of times, and add/accumulate the $\alpha_{F,i}-1$ number of BG measurements in the same charge storage unit. $\alpha_{F,i}-1$ is equal to the gain factor $\alpha_{F,i}$ for the corrupting light measurement corresponding to a given measurement $S_1$ minus 1. The measurements can be made in any suitable order. Effectively, a single charge storage unit can accumulate charge that correspond to $(S_i+(\alpha_{F,i}-1)S_2)$. If $\alpha_{F,i}-1$ is not an integer, it is possible to change the pulse width (or duration) of the BG measurements $S_2$ to produce a $\alpha_{F,i}-1$ multiple of a single BG measurement $S_2$. The pulse width can be pre-determined and programmed based on the gain factor $\alpha_{F,i}$. By manipulating the sensor signal for the same charge storage unit to perform and accumulate the measurement $S_i$ done once and the BG measurement $S_2$ done $\alpha_{F,i}-1$ number of times, the same charge storage unit can make the measurement equivalent to $(S_i+(\alpha_{F,i}-1)S_2)$. A separate charge storage unit is no longer needed for separately making the BG measurement $S_2$. This frees up a "free" charge storage unit (or eliminates the need for an additional charge storage unit) that can be used to isolate and measure the corrupting light F as illustrated by FIG. 8.

Using various techniques described herein, a measurement $S_0$ can be adjusted for corrupting light and BG light. Moreover, a pixel can make measurement $S_0$ (or any measurement $S_i$ that is impacted by corrupting light), a BG measurement $S_2$, and a corrupting light measurement F, by utilizing one charge storage unit for $S_0$ and $S_2$, and one charge storage unit for F.

Applying the same techniques, a measurement $S_1$ can also be adjusted for corrupting light and BG light. Specifically, the quantity $S_1-\alpha_{F,i}F+(\alpha_{F,1}-1)S_2$ can be free of corrupting light and BG light. Note that the gain factor $\alpha_{F,1}$, in this case, can be a ratio between the amount of corrupting light captured in $S_1$ and an amount of corrupting light captured in measurement F. The need to have three separate charge storage units for $S_1$, $S_2$ and F is obviated, since $S_1+(\alpha_{F,1}-1)S_2$ can be performed in hardware (i.e., using the same charge storage unit). Accordingly, the pixel can make measurement $S_1$ (which can also be impacted by corrupting light), a BG measurement $S_2$, and a corrupting light measurement F, by utilizing one charge storage unit for $S_1$ and $S_2$, and one charge storage unit for F.

Equation (4) can be modified as follows, to ensure that both measurement $S_0$ and measurement $S_1$ can be insensitive to corrupting light and BG light:

$$D = H\left( \frac{S_1 - \alpha_{F,1}F + (\alpha_{F,1} - 1)S_2}{[S_0 - \alpha_{F,0}F + (\alpha_{F,0} - 1)S_2] + [S_1 - \alpha_{F,1}F + (\alpha_{F,1} - 1)S_2]} \right) \quad \text{(eq. 5)}$$

This adjusted ratio $$\frac{S_1 - \alpha_{F,1}F + (\alpha_{F,1} - 1)S_2}{[S_0 - \alpha_{F,0}F + (\alpha_{F,0} - 1)S_2] + [S_1 - \alpha_{F,1}F + (\alpha_{F,1} - 1)S_2]}$$

for depth calculation can grow with depth, and can be provided as input to a lookup table implementing $H(x)$ to obtain an actual depth D.

The result is a pixel which can account for corrupting light and BG light with three charge storage units: one charge storage unit for $[S_0+(\alpha_{F,0}-1)S_2]$, one charge storage unit for $[S_1+(\alpha_{F,1}-1)S_2]$, and one charge storage unit for F. The three charge storage units are sufficient to measure the quantities for computing depth based on equation 5. The result is a pixel which can advantageously remove the contributions from corrupting light and BG light, and enable more accurate depth estimates to be computed.

Technique for Isolating and Measuring Corrupting Light without Requiring a Nanosecond Pulse In the technique illustrated by FIG. 8, the temporal separation of the corrupting light due to internal reflections and the return light from the object or objects within the field of view makes use of a short pulse of duration $T_C$. Suppose the corrupting objects are within 5 cm of the depth imager, and the goal is to measure depth of objects that are more than 20 cm away. To achieve temporal separation of the corrupting light due to an object less than 5 cm away and the return light reflecting off objects more than 20 cm away, $T_C$ has to be short enough to make sure that the corrupting light returns to the pixel before any light returns from an object at 20 cm away. This means that the width of the light pulse $T_C$ has to satisfy $$\frac{cT_C}{2} < 15 \text{ cm},$$

which gives $T_C \sim 1$ ns. Some drivers for driving light source 102 or the light source 102 itself cannot achieve a nanosecond width pulse of emitted light. Even if the driver can generate a short nanosecond pulse, it is possible that the output power of the emitted light is too low at that short light pulse width to get much signal back.

Figure 9:
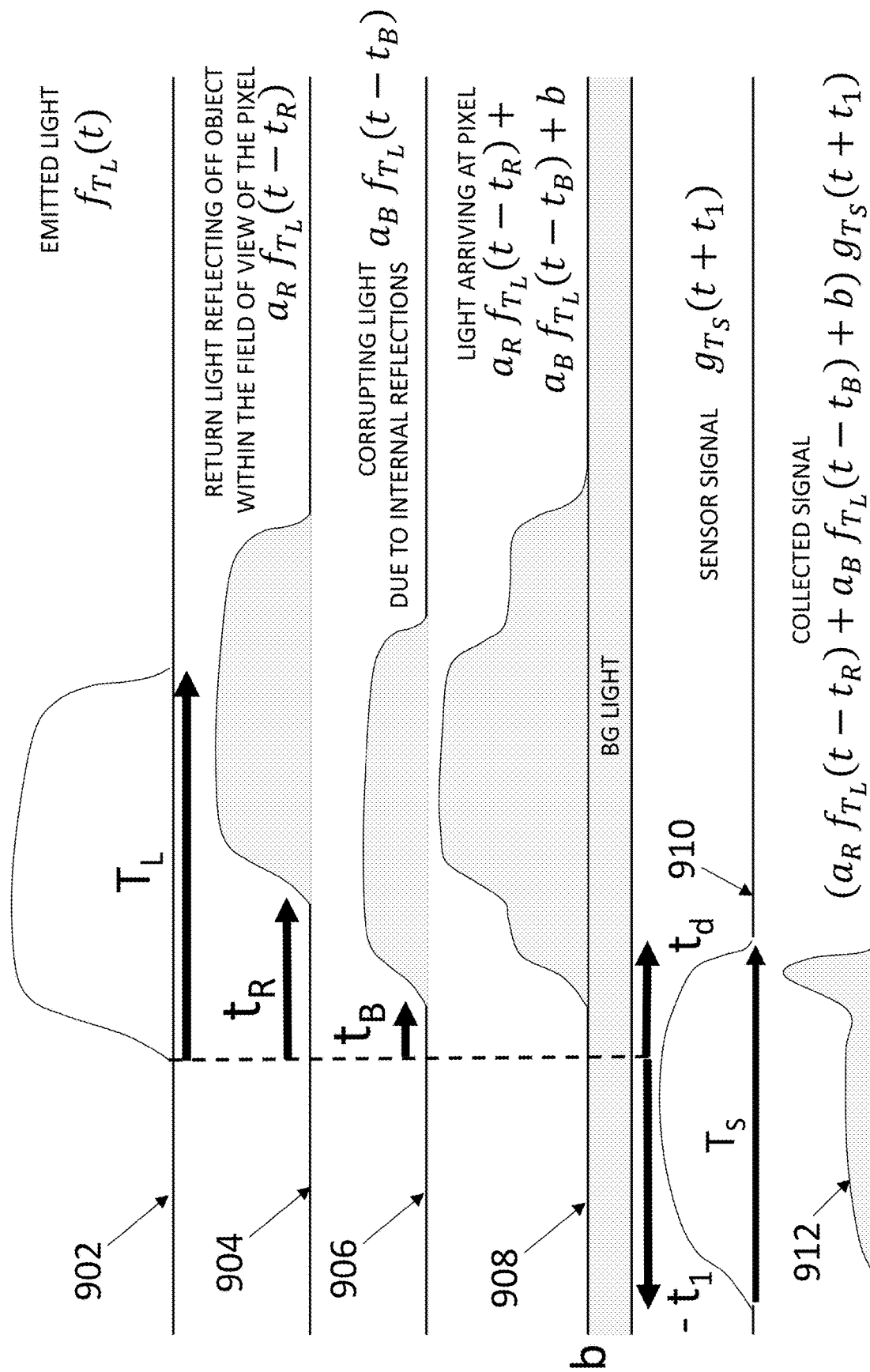
FIG. 9 illustrates another technique for isolating and measuring the corrupting light, according to some embodiments of the disclosure.

To address this issue, the charge storage units can be controlled in such a way to still isolate and measure the corrupting light. FIG. 9 illustrates another technique for isolating and measuring the corrupting light, according to some embodiments of the disclosure.

The emitted light (e.g., plot 902) by light source 102 is represented by $f_{T_L}(t)$. $T_L$ is the amount of time the light source 102 is on, and $T_L$ does not have to be short enough to temporally separate the return light reflecting off object or objects within the field of view of the pixel and the corrupting light. Return light reflecting off object (e.g., plot 904) within the field of view of the pixel is represented by $a_R f_{T_L}(t-t_R)$, where $a_R$ is a gain factor to account for the reduction in light returning to the pixel (e.g., reduction in amplitude) and $t_R$ is the amount of time for the light to travel to and from the object or objects within the field of view. Corrupting light due to internal reflections (e.g., plot 906) is represented by $a_B f_{T_L}(t-t_B)$, where $a_B$ is a gain factor to account for the reduction in light returning to the pixel (e.g., reduction in amplitude) and $t_B$ is the amount of time for the light return to the pixel after one or more internal reflection(s). One can see that the return light from object and the corrupting light overlap in time (both can hit the pixel during a period of time). Light arriving at the pixel (e.g., plot 908) is represented as $a_R f_{T_L}(t-t_R)+a_B f_{T_L}(t-t_B)+b$, which is a combination of the return light reflecting off object, the corrupting light, and BG light (represented by b). A charge storage unit can be controlled by sensor signal (e.g., plot 910), to start sensing light at $-t_1$ and stops sensing light at a delay time $t_d$. The charge storage unit thus sense for a duration of $T_S=t_1+t_d$. The sensor signal is represented by $g_{T_S}(t+t_1)$. The measurement by the charge storage unit is $F=M(T_L,-t_1,T_S)$. The collected signal (e.g., plot 912), which is a result of the corrupting light and BG light, is represented by $(a_R f_{T_L}(t-t_R)+a_B f_{T_L}(t-t_B)+b) g_{T_S}(t+t_1)$. The function $(a_R f_{T_L}(t-t_R)+a_B f_{T_L}(t-t_B)+b) g_{T_S}(t+t_1)$ is a combination of the function representing light arriving at the pixel and the function representing the sensor signal. Accordingly, the measurement representing a number of collected electrons is the integral of the collected signal: $\int (a_R f_{T_L}(t-t_R)+a_B f_{T_L}(t-t_B)+b) g_{T_S}(t+t_1)dt$. This measurement includes a contribution from BG light and a portion of corrupting light due to internal reflections. Delay time $t_d$ for turning off the sensor can be selected such that the pixel is only collecting light reflected off nearby (corrupting) objects and BG light.

As illustrated by the collected signal in FIG. 9, the charge storage unit stops sensing at $t_d$, where $t_d$ is after the time $t_B$ the corrupting light starts to hit the pixel and before the time $t_R$ that the return light reflecting off object hits the pixel. The result is equivalent to having sent out a light pulse of width $t_d$ (referred to as the effective pulse width) or shorter because no return light reflecting off the object in the field of view of the pixel is captured, and the corrupting light is effectively isolated and measured by turning off the sensor at $t_d$. By using an appropriate gain factor, the measurement seen in FIG. 9 can be used to remove the corrupting light from a measurement affected by the corrupting light.

This technique is effective if the corrupting object is known, e.g., at some fixed distance. For instance, the corrupting object could be a screen 704 at some fixed distance from the pixel. In another instance, the corrupting object can be at a distance short enough that it can be approximated to be zero distance. Otherwise, the effective pulse width captured from the corrupting object or objects would depend on the distance to the corrupting object.

For example, if the corrupting object is at a distance $D_C$, and the emitted light pulse is active for a time interval $T_L$, then the return light from the corrupting object would be active from time $2D_C/c$ to $T_L+2D_C/c$. If the sensor is active from time $-t_1$ to $t_d$ with $$\frac{2D_c}{c} < t_d < T_L + \frac{2D_c}{c},$$

then the sensor would be collecting light between times $$\frac{2D_c}{c}$$

and $t_d$. Therefore the time interval during which the sensor collects light has a width of $t_d-2D_C/c$. This quantity depends on the distance $D_c$ between sensor and corrupting object. If $D_C$ is negligible compared to $t_d$, as could be the case for corrupting objects very near the camera compared to $c\, t_d/2$, then this quantity would be only weakly dependent on $2D_C$. Another case would be a corrupting object such as a screen where $D_C$ is constant, therefore there is no variation of $t_d-2D_C/c$ with $D_C$ since $D_C$ is constant. In both these cases, the effective pulse width can be determined a priori. If the quantity $D_C$ varies to the point where the amount of corrupting light depends strongly on $D_C$, then it may be the case that a gain factor for removing the corrupting light cannot be determined a priori.

Obtaining Measurements with Simulated Short Light Pulse Widths

Figure 10:
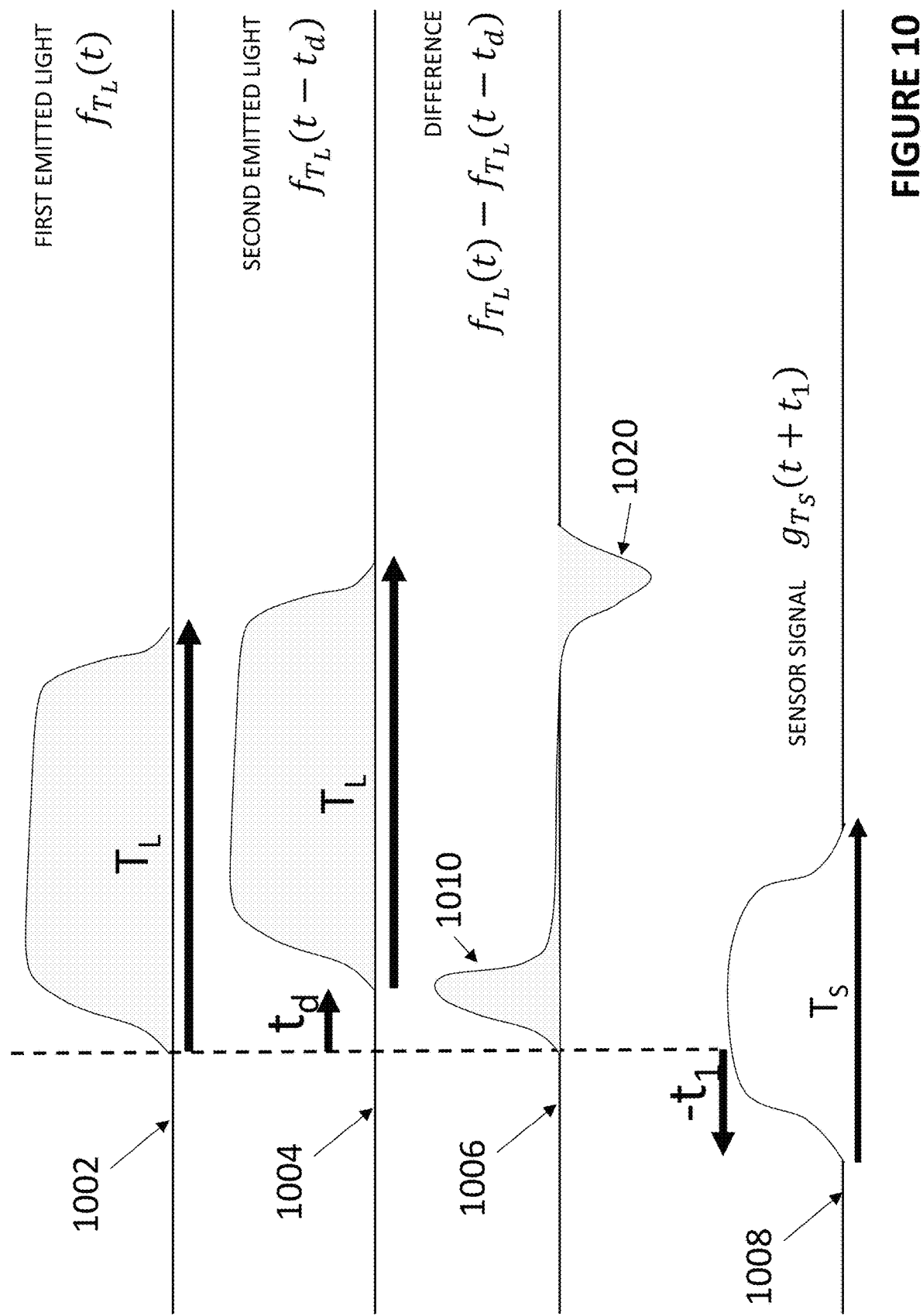
FIG. 10 illustrates a technique for effectively getting arbitrarily short pulses, according to some embodiments of the disclosure.

When the distance to the corrupting object can vary, a different technique can be used to effectively achieve short light pulse without having to generate one. FIG. 10 illustrates a technique for effectively getting arbitrarily short pulses, according to some embodiments of the disclosure. The technique involves two light pulses of width $T_L$ of the same shape but shifted in time by some delay time $t_d$. The first emitted light (e.g., plot 1002) by light source 102 is represented by $f_{T_L}(t)$. The first emitted light starts/begins at $t=0$, and has a duration of $T_L$. In this example, the first emitted light has a first start time at $t=0$ (or some suitable time $T_{start}$ within the frame of reference). The second emitted light (e.g., plot 1004) by light source 102 is represented by $f_{T_L}(t-t_d)$. The second emitted light starts/begins at $t=t_d$, and has a duration of $T_L$. Note that $t_0 \ll T_L$, or in other words, the duration $T_L$ is significantly greater than $t_d$. The second emitted light pulse has a same pulse shape as the first emitted light pulse, and has the same duration as the first emitted light pulse. The second emitted light pulse has a second start time that offset or delayed by a pre-determined amount of time $t_d$ relative to the first start time. If the first start time is at $t=T_{start}$, then the second start time is at $t=T_{start}+t_d$. When the second emitted light is subtracted from the first emitted light, the difference (e.g., plot 1006) would appear as a short positive pulse 1010 of width $t_d$, followed by a short negative pulse 1020 of width $t_d$, after a time $T_L-t_d$ of having minimal signal. The light output power is minimal between the positive pulse 1010 and the negative pulse 1020. A charge storage unit can be controlled by sensor signal (e.g., plot 1008), to start sensing light at $-t_1$ and for a duration of $T_S$. The sensor signal is represented by $g_{T_S}(t+t_1)$. It is possible to make two measurements: (1) a first measurement with the first emitted light and the sensor signal starting to sense at $-t_1$ and turning off at some time before the negative pulse 1020, and (2) a second measurement with the second emitted light and the sensor signal start sensing at $-t_1$ and turning off at some time before the negative pulse 1020. The sensor signal used for the first measurement has the same start time, duration, and shape as the sensor signal used for the second measurement. The sensor signals can turn on at or sometime before the start time of the first emitted light pulse (e.g., $t=0$), and turn off sometime before $T_L$ or $T_L-t_d$, and after $t_0$ (or after the start time of the second emitted light pulse). The first and second measurements defined by $-t_1$ and $T_S$ of the sensor signal can be determined based on $T_L$ and $t_d$. Subtracting the first measurement by the second measurement would yield an equivalent result to what would be obtained by exposing the scene with a short light pulse width $t_d$. Phrased differently, it is possible to obtain a measurement as if a short light pulse of width $t_d$ was used by (1) performing two measurements with the same sensor signal (e.g., plot 1008) with light pulses which are slightly delayed with respect to each other, and (2) obtaining a difference of the two measurements. Using this technique, arbitrarily small light pulses can be simulated, even if the driver or the light source cannot output short light pulses directly. This resulting measurement can thus capture corrupting light and BG light, and is referred to below as the resulting corrupting light measurement.

This simulation technique may use two charge storage units to obtain the first and the second measurement, which may require an additional charge storage unit for the pixel. However, one can remove the need to include an additional charge storage unit by recognizing that part of the subtraction can be reformulated as addition. A given charge storage unit can be operated with a proper sensor signal such that the charge storage unit can be reused to make multiple measurements and implement addition/accumulation of the measurements. Suppose the first measurement is denoted as $F_1$ and the second measurement is denoted as $F_2$. The resulting corrupting light measurement after subtraction, each capturing corrupting light and BG light, is denoted as $F_1-F_2$. Because both the first measurement $F_1$ and the second measurement $F_2$ include a component of BG light, the subtraction of $F_1$ by $F_2$ removes/cancels out the common component of BG light, leaving just the component of corrupting light. To ensure that the depth estimation can be tolerant to corrupting light (i.e., $F_1-F_2$) and BG light (i.e., $S_2$), it is possible to remove or adjust for the corrupting light and BG light by subtracting a measurement $S_i$ by the resulting corrupting light measurement $F_1-F_2$ multiplied by a gain factor $\alpha_{F,i}$ and by a BG light measurement $S_2$, that is: $S_i'=S_1-\alpha_{F,i}(F_1-F_2)-S_2$. A depth D for the pixel can be obtained by computing the following exemplary equation:

$$D = H\left(\frac{S_1'}{S_0'+S_1'}\right) = \quad \text{(eq. 6)}$$

-continued
$$H\left(\frac{S_1-\alpha_{F,1}(F_1-F_2)-S_2}{S_0-\alpha_{F,0}(F_1-F_2)-S_2+S_1-\alpha_{F,1}(F_1-F_2)-S_2}\right)$$

This ratio $$\frac{S_1'}{S_0'+S_1'}$$

for depth calculation can grow with depth, and can be provided as input to a look up table implementing H(x) to obtain an actual depth D.

Note that $S_i'=S_i-\alpha_{F,i}(F_1-F_2)-S_2$ can be rewritten as $S_i'=(S_i+\alpha_{F,i}F_2)-(\alpha_{F,i}F_1+S_2)$. Equation 6 can be rewritten as follows:

$$D = H\left(\frac{S_1'}{S_0'+S_1'}\right) = H\left(\frac{(S_1+\alpha_{F,1}F_2)-(\alpha_{F,1}F_1+S_2)}{(S_0+\alpha_{F,0}F_2)-(\alpha_{F,0}F_1+S_2)+(S_1+\alpha_{F,1}F_2)-(\alpha_{F,1}F_1+S_2)}\right) \quad \text{(eq. 7)}$$

With this rewritten quantity, $S_i'=(S_1+\alpha_{F,i}F_2)-(\alpha_{F,i}F_1+S_2)$, it is possible to use a first charge storage unit to obtain $(S_i+\alpha_{F,i}F_2)$ and second charge storage unit to obtain $(\alpha_{F,i}F_1+S_2)$. Specifically, to form a depth estimate that is tolerant to corrupting light (i.e., $F_1-F_2$) and BG light (i.e., $S_2$), the depth imager can use a total of four charge storage units to obtain the quantities used in equation (7). A first charge storage unit can obtain $(S_1+\alpha_{F,1}F_2)$. A second charge storage unit can obtain $(\alpha_{F,1}F+S_2)$. A third charge storage unit can obtain $(S_0+\alpha_{F,0}F_2)$. A fourth charge storage unit can obtain $(\alpha_{F,0}F_1+S_2)$.

The quantity $S_i+\alpha_{F,i}F_2$ can be stored in the charge storage unit that was originally used for $S_i$. Accordingly, $S_i+\alpha_{F,i}F_2$ can be implemented by controlling a first charge storage unit for measuring $S_i$ in a suitable manner to make and add the $\alpha_{F,i}F_2$ measurement directly in the same charge storage unit. $\alpha_{F,i}F_2$ can be added directly to the same charge storage unit in hardware. The same charge storage unit can be used to make a measurement corresponding to $S_i$ and the measurement is stored in the charge storage unit. The same charge storage unit can make the second measurement $F_2$, $\alpha_{F,i}$ number of times, and add/accumulate the $\alpha_{F,i}$ number of measurement $F_2$ in the same charge storage unit. In this case, the gain factor $\alpha_{F,i}$ can be a ratio between the amount of corrupting light captured in $S_i$ and an amount of corrupting light captured in measurement $F_1-F_2$. Effectively, a single charge storage unit can make the measurement $S_i+\alpha_{F,i}F_2$. If $\alpha_{F,i}$ is not an integer, it is possible to change the pulse width (or duration) of the second measurement $F_2$ to produce a integer multiple of a single second measurement $F_2$. An exemplary approach would be to simply approximate $\alpha_{F,i}$ to the nearest integer. The pulse width, associated with the gain factor $\alpha_{F,i}$ can be pre-determined and programmed by determining the amount of corrupting light captured in $S_i$, the amount of corrupting light captured in $F_1-F_2$, and taking ratio of the two amounts. Manipulating the sensor signal for the same charge storage unit to perform and accumulate the measurement $S_i$ done once and the second measurement $F_2$ done $\alpha_{F,i}$ number of times, the same charge storage unit can make the measurement equivalent to $S_i+\alpha_{F,i}F_2$. A separate charge storage unit is no longer needed for separately making the corrupting light measurement $F_2$.

The quantity $\alpha_{F,i}F_1+S_2$ can be stored in the charge storage unit that was originally used for $S_2$, once again by altering the pulse width of the $F_1$ measurement and repeating its measurement an integer number of times such that its contribution being accumulated in the charge storage unit is approximately $\alpha_{F,i}F_1$. Accordingly, $\alpha_{F,i}F_1+S_2$ can be implemented by controlling a second charge storage unit for measuring $S_2$ in a suitable manner to make and add the $\alpha_{F,i}F_1$ measurement directly in the same charge storage unit. $\alpha_{F,i}F_1$ can be added directly to the same charge storage unit in hardware. The same charge storage unit can be used to make a measurement corresponding to $S_2$ and the measurement is stored in the charge storage unit. The same charge storage unit can make the second measurement $F_1$, $\alpha_{F,i}$ number of times, and add/accumulate the $\alpha_{F,i}$ number of measurement $F_1$ in the same charge storage unit. In this case, the gain factor $\alpha_F$, can be a ratio between the amount of corrupting light captured in $S_i$ and an amount of corrupting light captured in measurement $F_1-F_2$. Effectively, a single charge storage unit can make the measurement $\alpha_{F,i}F_1+S_2$. If $\alpha_F$ is not an integer, it is possible to change the pulse width (or duration) of the first measurement $F_1$ to produce a integer multiple of a single first measurement $F_1$. An exemplary approach would be to simply approximate $\alpha_{F,i}$ to the nearest integer. The pulse width, associated with the gain factor $\alpha_{F,i}$ can be pre-determined and programmed by determining the amount of corrupting light captured in $S_i$, the amount of corrupting light captured in $F_1-F_2$, and taking ratio of the two amounts. Manipulating the sensor signal for the same charge storage unit to perform and accumulate the measurement $S_2$ done once and the first measurement $F_1$ done $\alpha_{F,i}$ number of times, the same charge storage unit can make the measurement equivalent to $\alpha_{F,i}F_1+S_2$. A separate charge storage unit is no longer needed for separately making the corrupting light measurement $F_1$.

In some embodiments, the measurement $S_0$ has some amount of corrupting light or is significantly affected by the corrupting light, and the measurement $S_1$ does not have any corrupting light, or is minimally affected by the corrupting light. For example, the measurement $S_0$ can begin to collect charge at $t=t_0$, and the measurement $S_1$ can begin to collect charge much later, at $t=t_1$. The start time of the measurement $S_1$ can be set to ensure that the measurement $S_1$ does not collect any corrupting light. The gain factor $\alpha_{F,1}$, seen in equations (6) and (7), is thus zero. If the measurement $S_1$ has no contribution from corrupting light, then equation (6) and (7) can be formulated as follows:

$$D = H\left(\frac{S_1 - S_2}{S_0' + S_1 - S_2}\right) = H\left(\frac{S_1 - S_2}{S_0 - \alpha_{F,0}(F_1 - F_2) - S_2 + S_1 - S_2}\right) \quad \text{(eq. 8)}$$

Equation (8) can be rewritten as:

$$D = H\left(\frac{S_1 - S_2}{S_0' + S_1 - S_2}\right) = \left(\frac{S_1 - S_2}{S_0 - \alpha_{F,0}(F_1 - F_2) - S_2 + S_1 - S_2}\right) = \quad \text{(eq. 9)}$$
$$H\left(\frac{(S_1 + \alpha_{F,0}F_1) - (S_2 + \alpha_{F,0}F_1)}{(S_0 + \alpha_{F,0}F_2) - (S_2 + \alpha_{F,0}F_1) + (S_1 + \alpha_{F,0}F_1) - (S_2 + \alpha_{F,0}F_1)}\right)$$

With this rewritten equation, to form a depth estimate where the measurement $S_0$ is tolerant to corrupting light (i.e., $F_1-F_2$) and BG light (i.e., $S_2$), and the measurement $S_1$ is tolerant to BG light, the depth imager can use a total of three charge storage units to obtain the quantities used in equation (9). A first charge storage unit can obtain $(S_0+\alpha_{F,0}F_2)$. A second charge storage unit can obtain $(S_1+\alpha_{F,0}F_1)$. A third charge storage unit can obtain $(S_2+\alpha_{F,0}F_1)$.

Approaches to Remove a Contribution from Corrupting Light

As explained herein, it is possible to adjust measurements by measuring the corrupting light through the use of short light pulses as seen in FIG. 8 or through the techniques illustrated by FIGS. 9 and 10. Given two measurements $S_0$ and $S_1$, where each measurement has collected some amount of corrupting light $C_0$ and $C_1$, respectively, the quantity $$S_0 = \frac{C_0}{C_1}S_1$$

can be free of corrupting light, as the amount of corrupting light in the first term is $C_0$, and the amount of corrupting light in the second term is $$\frac{C_0}{C_1}C_1 = C_0,$$

thus they cancel out. The quantity is equal to the measurement $S_0$ subtracted by the measurement $S_1$ multiplied by a ratio of the corrupting light $C_0$ and the corrupting light $C_1$. The ratio is between an amount of corrupting light collected in $S_0$ and an amount of corrupting light collected in $S_1$. With the appropriate ratio, the contribution from corrupting light can be removed from the measurement $S_0$ by subtracting $$\frac{C_0}{C_1}S_1$$

from $S_0$. Based on the shape pulses, it is possible to know or estimate corrupting light $C_0$ and $C_1$ a priori, thus the ratio can be determined a priori. The amount of corrupting light captured can, in some cases, depend on the amount of time that both the sensor signal and return corrupting light are on at the same time. The ratio of corrupting light captured in the two measurements $S_0$ and $S_1$ can thus be used as the gain factor in many of the operations described herein.

For example, if $S_0$ corresponds to the measurement $M(T_{L_0},t_0,T_{S_0})$, then the sensor is on from time $t_0$ to $t_0+T_{S_0}$. If the corrupting object is at distance $D_c$, the return corrupting light is on from times $$\frac{2D_c}{c} \text{ to } \frac{2D_c}{c} + T_{L_0}.$$

If, for example $$t_0 < \frac{2D_c}{c} < t_0 + T_{S_0} < T_{L_0} + \frac{2D_c}{c},$$

then the sensor and return corrupting light are both on from times $$\frac{2D_c}{c} \text{ to } t_0 + T_{S_0}.$$

If, furthermore, $S_1$ corresponds to the measurement $M(T_{L_1}, t_1, T_1)$, and the corrupting object is as before at distance $D_c$, then the return corrupting light is on from times $$\frac{2D_c}{c} \text{ to } \frac{2D_c}{c} + T_{L_1}.$$

If, for example $$\frac{2D_c}{c} < t_1 < T_{L_1} + \frac{2D_c}{c} < t_1 + T_{S_1},$$

then the sensor and corrupting light are both on from time $t_1$ to $$T_{L_1} + \frac{2D_c}{c}.$$

If, all the pulses are square, then the amount of corrupting light captured in $S_0$ is proportional to the time amount of time $$t_{C_0} = t_0 + T_{S_0} - \frac{2D_c}{c}$$

that both the sensor and return corrupting light are active during the $S_0$ measurement, while the amount of corrupting light in $S_1$ is proportional to the amount of time $$t_{C_1} = \frac{2D_c}{c} + T_{L_1} - t_1$$

that both the corrupting light and sensor are active during the $S_1$ measurement. In that case, $$\frac{t_{C_0}}{t_{C_1}} S_1 - S_0$$

is a quantity where the corrupting light has been removed.

If, the pulses are not exactly square but approximately square, then this equation may still be approximately insensitive to corrupting light. If the pulses deviate significantly from square, then the amount of corrupting light will be a function of the shape of the pulses. By determining the shape of the pulses, or by empirically adding a corrupting object in the scene, performing a measurement, then removing the corrupting object in the scene and performing the same measurement, and subtracting the first measurement from the second measurement, one obtain purely the corrupting light. By performing this scheme for the $S_0$ measurement one obtains $C_0$, and by performing this scheme for $S_1$ one obtains $C_1$. Then the gain factor or ratio $$\alpha = \frac{C_0}{C_1}$$

can be stored. For example, if the distance to the corrupting object is known a priori this scheme for obtaining gain factor $\alpha$ is carried out with the corrupting object at the known distance to the corrupting object.

If the effect of corrupting light is to be removed for corrupting objects in a pre-determined interval of distances then $\alpha$ can be obtained for different distances to corrupting objects within the pre-determined interval of distances, and it can be verified whether $\alpha$ varies a small enough amount in the interval, in which case, one would choose for $\alpha$ a value that is close to the values obtained in the interval. Once gain factor $\alpha$ is pre-determined, and new $S_0$ and $S_1$ measurements are performed, then the quantity $S_0 - \alpha S_1$ can be obtained, which will be either fully or approximately free of corrupting light.

Accordingly, it is possible to form quantities which are uncorrupted and use the uncorrupted quantities for uncorrupted depth estimates. If it is possible additional charge storage unit(s) can be used to store the corrupted light. Alternatively, whenever there is a quantity in the depth estimation equation of the form A−B+C−D+ . . . , the depth estimation equation can be rewritten as (A+C+ . . . )−(B+D+ . . . ), and the summations can be performed directly in hardware (i.e., by reusing the same charge storage unit to make multiple measurements). As a result, additional charge storage units to make and store the corrupting light measurement are no longer needed.

Avoiding Corruption of Time-of-Flight Depth Images Due to Internal Scattering

One other possible way of making sure that the depth images are not corrupted by internal scattering or diffraction is to turn on sensor(s) past the point where the last corrupting light (due to internal scattering) is hitting the sensor, or at a point where the last corrupting light hitting the sensor is negligible. This methodology avoids the corrupting light altogether, by design, and the resulting depth estimate computed from the sensor measurements would be uncorrupted.

Figure 11:
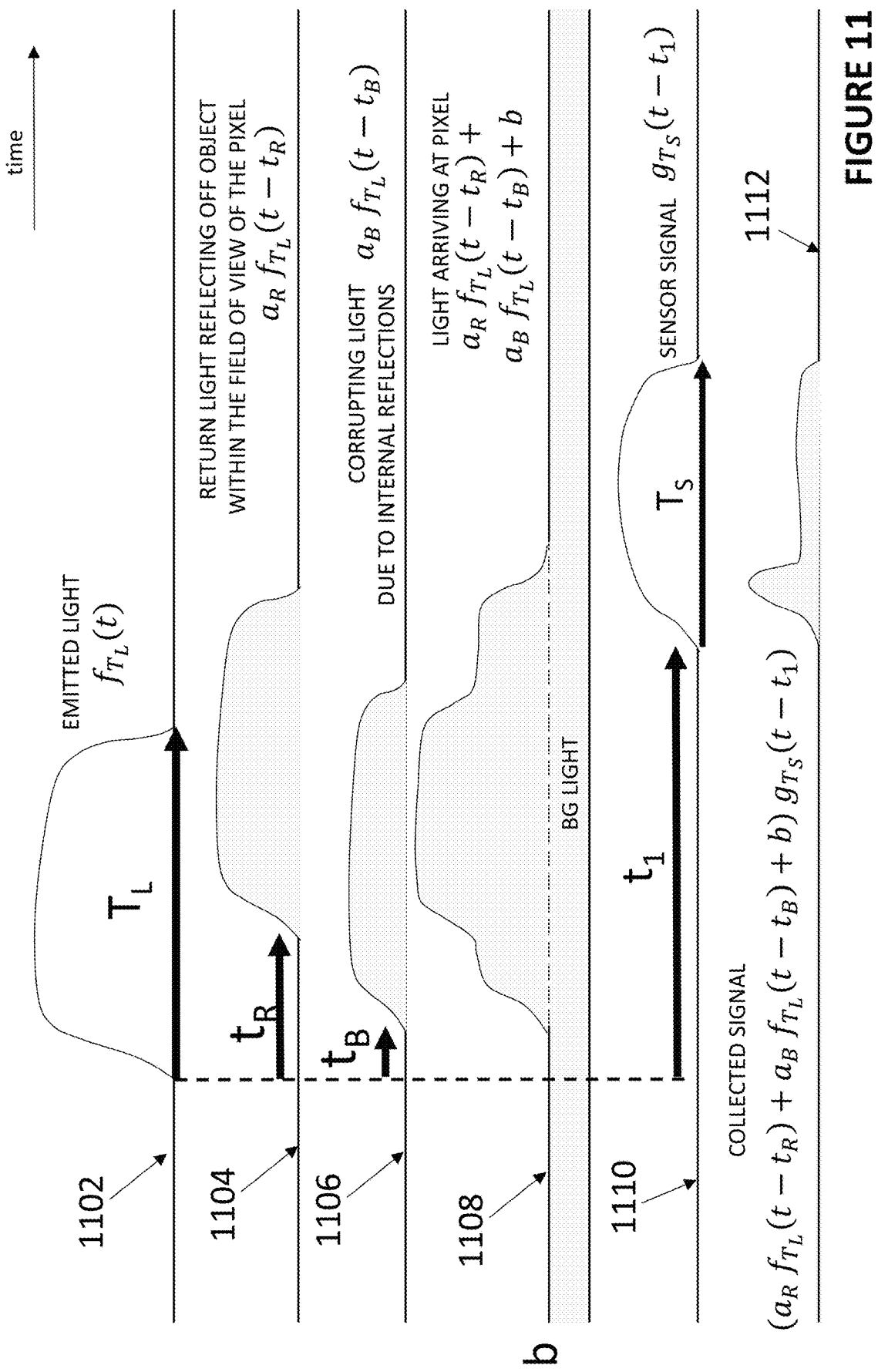
FIG. 11 illustrates turning on a sensor (or start collecting light) after the light pulse is off, according to some embodiments of the disclosure.

FIG. 11 illustrates turning on a sensor (or starting to collect light) after the light pulse is off, according to some embodiments of the disclosure. The emitted light (e.g., plot 1102) by light source 102 is represented by $f_{T_L}(t)$. $T_L$ is the amount of time the light source 102 is on. Return light reflecting off an object (e.g., plot 1104) or objects within the field of view of the pixel is represented by $a_R f_{T_L}(t-t_R)$, where $a_R$ is a gain factor to account for the reduction in light returning to the pixel (e.g., reduction in amplitude) and $t_R$ is the amount of time for the light to travel to and from the object or objects within the field of view. Corrupting light due to internal reflections (e.g., plot 1106) is represented by $a_B f_{T_L}(t-t_B)$, where $a_B$ is a gain factor to account for the reduction in light returning to the pixel (e.g., reduction in amplitude) and $t_B$ is the amount of time for the light return to the pixel after one or more internal reflection(s). Light arriving at the pixel (e.g., plot 1108) is represented as $a_R f_{T_L}(t-t_R)+a_B f_{T_L}(t-t_B)+b$, which is a combination of the return light reflecting off object, the corrupting light, and BG light (represented by b). A charge storage unit can be controlled by a sensor signal (e.g., plot 1110), to start sensing light at $t_1$ and for a duration of $T_S$. The sensor signal is represented by $g_{T_S}(t-t_1)$. The measurement by the charge storage unit is $M(T_L, t_1, T_S)$. $t_1$ is preferably greater than $T_L$, meaning that the sensor starts collecting light after the light pulse is off, or smaller than $T_L$ but large enough so that the amount of corrupting light received is negligible within some tolerance. The collected signal (e.g., plot 1112), is represented by $(a_R\ f_{T_L}(t-t_R)+a_B\ f_{T_L}(t-t_B)+b)\ g_{T_S}(t-t_1)$. The function $(a_R\ f_{T_L}(t-t_R)+a_B\ f_{T_L}(t-t_B)+b)\ g_{T_S}(t+t_1)$ is a combination of the function representing light arriving at the pixel and the function representing the sensor signal. Accordingly, the measurement representing a number of collected electrons is the integral of the collected signal: $\int (a_R\ f_{T_L}(t-t_R)+a_B\ f_{T_L}(t-t_B)+b)\ g_{T_S}(t+t_1)dt$. By design (i.e., selecting the appropriate $t_1$), $a_R\ f_{T_L}(t-t_R)$, i.e., the contribution from the corrupting light due to internal reflections, is zero or minimal during the period of time the sensor is on. As a result, the measurement avoids corrupting light (but would have some contribution from BG light).

If $t_{B,max}$ is the maximum travel time of a pulse going to a nearby corrupting object and returning to the sensor, a measurement $S_0=M(T_L,t_1,T_S)=M(T_L,t_{B,max},T_S)$ would not collect any light from the nearby corrupting object, as long as $t_1 \geq T_L+t_{B,max}$. The quantity $t_{B,max}$ can be determined to be either a time after light reflecting off object(s) with a known distance to sensor, such as a glass cover, returns to the sensor, or a time such that object(s) that contribute to corruption do so in a small enough amount so as not to significantly affect depth estimates. If the distance $d_{B,max}$ is the largest distance between the object(s) and sensor for which the object(s) can still lead to significant corruption, then setting $t_{B,max}$ to $2\ d_{B,max}/c$ or larger, where c is the speed of light, will lead to $S_0$ not having significant contribution from corrupting light. For example if objects further than 10 centimeters away from the sensor do not lead to significant corruption due to internal reflection, then setting $t_{B,max} \geq 2*10$ cm/c will lead to $S_0$ being approximately free of corruption. To make the measurement $S_0$, a charge storage unit can start collecting light after the amount of time $T_L$ the light source 102 is on, plus the maximum travel time $t_{B,max}$, and capture light for a duration of $T_S$.

If $t_{min}$ is the travel time for a pulse to travel to object(s) at the minimum distance $D_{min}$ at which the depth camera would begin to report depths (e.g., $D_{min}=20$ cm), another measurement $S_1$ can be made where $t_1=T_L+t_{min}$. That is, $S_1=M(T_L,T_L+t_{min},T_S)$. To make the measurement $S_1$, a charge storage unit can start capturing light after the amount of time $T_L$ the light source 102 is on plus the travel time $t_{min}$, and capture light for a duration of $T_S$. $t_{B,max}$ is shorter than $t_{min}$, which means that the charge storage unit making the measurement $S_1$ starts collecting light after the charge storage unit making the measurement $S_0$ starts collecting light. This also means that the measurement $S_1$ would also not collect any light from the nearby corrupting object.

A further measurement $S_2$ can be made to capture BG light. $S_2$ can collect BG light for a time $T_S$ with the light source 102 off. $S_2$ can collect light from times $t=-t_2$ to $t=-t_2+T_S$. The measurement being made by $S_2$ is $M(T_L,-t_2,T_S)$. In one case, $t_2=T_S$, and thus $S_2$ can collect light from times $t=-t_2=-T_S$ to $t=0$. In another case, $S_2$ is $M(0,0,T_S)$, and the light source is kept off during the $S_2$ measurement, thus only capturing BG light. Generally speaking, the measurement $S_2$ collects BG light for a period of time where no light is received from the light source the light source 102.

Figure 12:
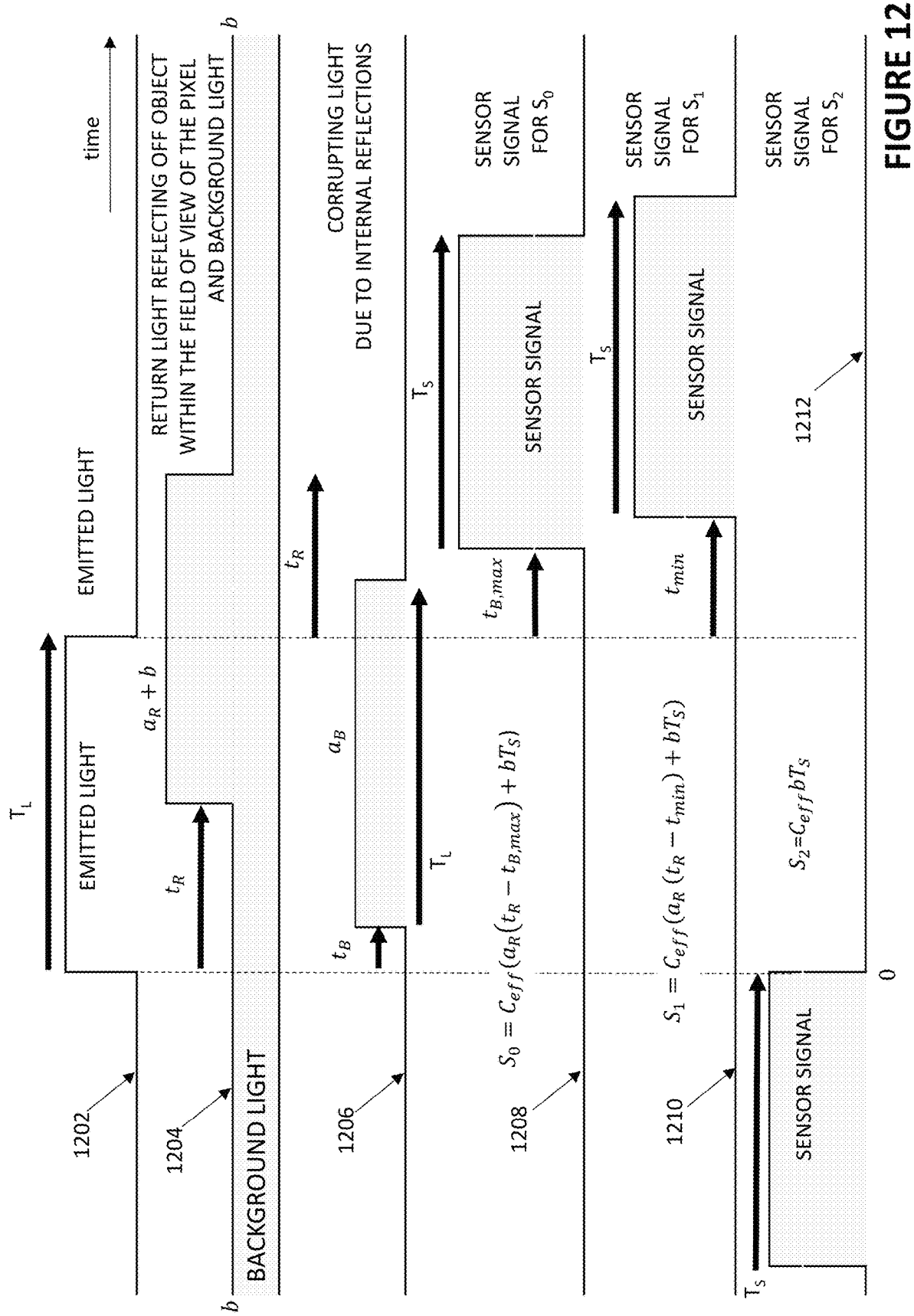
FIG. 12 illustrates measuring distance using a technique which turns on a sensor (or start collecting light) after the light pulse is off, according to some embodiments of the disclosure.

FIG. 12 illustrates measuring distance based on a technique which turns on a sensor (or starting to collect light) after the light pulse is off, according to some embodiments of the disclosure. By design, the three measurements $S_0$, $S_1$, and $S_2$ do not capture any light from nearby corrupting objects or corrupting light caused by internal reflections. Therefore, a depth estimate can be obtained that is insensitive to corrupting light based on these three measurements $S_0$, $S_1$, and $S_2$. With the three measurements $S_0$, $S_1$, and $S_2$, it is possible to obtain a depth estimate by designing and computing a quantity based on the three measurements $S_0$, $S_1$, and $S_2$ that grows with or is (positively) related to depth. Such a quantity can indicate depth. One exemplary quantity based on the three measurements $S_0$, $S_1$, and $S_2$ is $(S_1-S_2)/(S_0-S_1)$. The quantity is a ratio of (1) the measurement $S_1$ minus the BG light measurement $S_2$ and (2) the measurement $S_0$ minus the measurement $S_1$. To illustrate, FIG. 12 shows the case where the laser pulse and sensor pulses are perfectly square. Plot 1202 illustrates the emitted light. Plot 1204 illustrates return light reflecting off an object or objects within the field of view of the pixel and background light. Plot 1206 illustrates corrupting light due to internal reflections. Plot 1208 illustrates the sensor signal for making measurement $S_0$. Plot 1210 illustrates the sensor signal for making measurement $S_1$. Plot 1212 illustrates the sensor signal for making BG light measurement $S_2$.

To illustrate measuring distance using the technique for turning on the sensor after the light pulse is off to avoid corrupting light, FIG. 12 shows how the quantity $(S_1-S_2)/(S_0-S_1)$ is proportional to the depth. The return light from the light source (whose emitted light is shown as plot 1202) is on from times $t_R$ to $t_R+T_L$, with some amount of light per unit time $a_R$ arriving at the sensor. The background light arriving at the sensor per unit time is denoted by b. The combination of return light from the light source and background light is shown as plot 1204. The corrupting light shown as plot 1206 arriving at the sensor is on from times $t_B$ to $t_B+T_L$, and the amount of corrupting light per unit time when the corrupting light is being received is denoted by $a_B$. The sensor signal shown as plot 1208 for $S_0$ is on from times $T_L+t_{B,max}$ to $T_L+t_{B,max}+T_S$. Therefore, denoting $C_{eff}$ as the photoconversion efficiency of the sensor which, when multiplied by the number of photons hitting the sensor, gives the final output value of the sensor, $S_0=C_{eff}(a_R(t_R-t_{B,max})+bT_S)$. $a_R(t_R-t_{B,max})$ represents the amount of return light hitting the sensor during the time when the sensor is on. $bT_S$ represents the amount of BG light hitting the sensor during the time when the sensor is on. The sensor signal shown as plot 1210 for $S_1$ is on from times $T_L+t_{min}$ to $T_L+t_{min}+T_S$. Therefore, $S_1=C_{eff}(a_R(t_R-t_{min})+bT_S)$. $a_R(t_R-t_{min})$ represents the amount of return light hitting the sensor during the time when the sensor is on. $bT_S$ represents the amount of BG light hitting the sensor during the time when the sensor is on. The sensor signal shown as plot 1212 for $S_2$ is on for a time $T_S$ when no light is received from the light source, and therefore $S_2=C_{eff}\ b\ T_S$.

Based on these measurements, the amount of time for the light to return from the object can be derived based on $t_{min}$, $t_{B,max}$, $S_0$, $S_1$, and $S_2$ according to the following equation.

$$t_R = t_{min} + (t_{min} - t_{B,max})\frac{S_1 - S_2}{S_0 - S_1}.$$

Moreover, the depth of the object of interest can then given by $$D = \frac{ct_R}{2} = \frac{c}{2}\left(t_{min} + (t_{min} - t_{B,max})\frac{S_1 - S_2}{S_0 - S_1}\right).$$

Note that the numerator of the ratio, $S_1-S_2$, is a quantity that represents the measurement $S_1$ with the contribution from BG light subtracted out. The quantity $S_1$ or $S_1-S_2$, would get larger as the distance/depth of the object grows. Note that the denominator of the ratio, $S_0-S_1$, is a quantity that represents a difference between the measurement $S_0$ and the measurement $S_1$. $S_0-S_1=C_{eff}(a_R(t_R-t_{B,max})+bT_S)-C_{eff}(a_R(t_R-t_{min})+bT_S)=C_{eff}(a_R(-t_{B,max}+t_{min}))$. Note that this quantity is independent of $t_R$, which means that this quantity is independent of the distance/depth of the object. Accordingly, the ratio $$\frac{S_1-S_2}{S_0-S_1}$$

is positively related to the distance/depth of the object grows.

In the case where the pulses are not perfectly square, it is possible to measure the ratio $(S_1-S_2)/(S_0-S_1)$ as a function of depth and store the values in a lookup table. The lookup table implements a function $H(x)$ such that $$H\left(\frac{S_1-S_2}{S_0-S_1}\right) = D$$

and can convert the ratio into a depth estimate. In other words, the result from the lookup table based on the ratio $(S_1-S_2)/(S_0-S_1)$ can output a corrected depth estimate. Values for $H(x)$ can be extrapolated between the values of x for which $H(x)$ is known. The depth equation becomes:

$$D = H\left(\frac{S_1-S_2}{S_0-S_1}\right) \quad \text{(eq. 10)}$$

Examples

Example 1 is a method to measure depth that is insensitive to corrupting light due to internal reflections, the method comprising: emitting light by a light source onto a scene; making a corrupting light measurement (e.g., F) by controlling a first charge storage unit of a pixel to collect charge based on light hitting the pixel during a first time period where the corrupting light hits the pixel but no return light from an object within a field of view of the pixel hits the pixel; removing a contribution (e.g., $\alpha_F C$, or $\alpha_{F,i} F$) from the corrupting light from one or more measurements affected by the corrupting light (e.g., $S_0$ or $S_1$) based on the corrupting light measurement; and determining the depth based on the one or more measurements with the contribution from the corrupting light removed. Exemplary embodiments are illustrated in FIGS. 8 and 9 and the description accompanying thereof.

In Example 2, the method of Example 1 can optionally include the light being emitted onto the scene for a duration that is short enough to separate (1) the corrupting light hitting the pixel, and (2) reflected light from the object hitting the pixel, in time. Exemplary embodiments are illustrated in FIG. 8 and the description accompanying thereof.

In Example 3, the method of Example 1 or 2 can optionally include the first time period ending after all corrupting light is collected and before the return light from the object hits the pixel. Exemplary embodiments are illustrated in FIG. 8 and the description accompanying thereof.

In Example 4, the method of Example 1 can optionally include the first time period ending after a portion of the corrupting light is collected and before the return light from the object hits the pixel. Exemplary embodiments are illustrated in FIG. 9 and the description accompanying thereof.

In Example 5, the method of Example 4 can optionally include determining the contribution from the corrupting light by scaling the corrupting light measurement by a gain factor. Exemplary embodiments are illustrated in FIG. 9 and the description accompanying thereof.

In Example 6, the method of any one of Examples 1-5 can optionally include the corrupting light measurement including a contribution from background light and a contribution from the corrupting light. For example, the measurement F equals to BG plus C.

In Example 7, the method of any one of Examples 1-6 can optionally include: making a background light measurement (e.g., $S_2$); and removing a contribution from the background light (e.g., BG) from the corrupting light measurement based on the background light measurement (e.g., $S_2$) to obtain the contribution from the corrupting light (e.g. C). For example, C can be obtained from F minus BG.

In Example 8, the method of Example 7 can optionally include making the background light measurement comprising: controlling a second charge storage unit (e.g., $S_2$) of the pixel to collect charge based on the background light hitting the pixel during a second time period when the light source is not emitting light (or only background light is hitting the pixel, or no reflected light from objects is hitting the pixel).

In Example 9, the method of any one of Examples 1-8 can optionally include: removing the contribution from the corrupting light (e.g., $\alpha_F C$) from one or more measurements affected by the corrupting light comprises: scaling the contribution from the corrupting light (e.g., C) by a gain factor (e.g., $\alpha_F$); and removing a scaled contribution from the corrupting light from the one or more measurements affected by the corrupting light. For instance, if M is the measurement affected by the corrupting light, the contribution from the corrupting light is removed by determining the quantity: $M-\alpha_F C$.

In Example 10, the method of Example 9 can optionally include the gain factor (e.g., $\alpha_F$) being based on a ratio of a duration of emitted light (e.g., $T_L$) used in the one or more measurement and a duration of emitted light (e.g., $T_C$) used in the corrupting light measurement. For instance, the gain factor $\alpha_F$ can equal to $$\frac{T_L}{T_C}.$$

In Example 11, the method of Example 9 or 10 can optionally include the gain factor (e.g., $\alpha_F$) being based on a ratio of an amount of corrupting light (e.g., $f_{C,M}$) collected in the one or more measurement and an amount of corrupting light (e.g., $f_C$) collected in the corrupting light measurement. For instance, the gain factor $\alpha_F$ can equal to $$\frac{f_{C,M}}{f_C},$$

In Example 12, the method of any one of Examples 1-11 can optionally include removing the contribution from the corrupting light (e.g., $\alpha_F C$) from one or more measurements affected by the corrupting light comprising: scaling the corrupting light measurement by a first gain factor (e.g., F is scaled by $\alpha_{F,i}$); and subtracting a scaled corrupting light measurement from the one or more measurements affected by the corrupting light (e.g., determining $S_i - \alpha_{F,i} F$).

In Example 13, the method of Example 12 can optionally include: making a background light measurement (e.g., $S_2$); and scaling the background light measurement by a second gain factor (e.g., $(\alpha_{F,i} - 1)$); adding a scaled background light measurement to the one or more measurements affected by the corrupting light (e.g., perform $S_1 + (\alpha_{F,i} - 1) S_2$).

In Example 14, the method of Example 13 can optionally include the second gain factor being equal to the first gain factor subtracted by 1 (e.g., $(\alpha_{F,i} - 1)$).

For instance, an adjusted measurement St, where the corruption from the corrupting light is removed, can be equal to $S_i - \alpha_{F,i} F + (\alpha_{F,i} - 1) S_2$. The adjusted measurement $S_i'$ can be obtained by performing the method in Example 12, 13, or 14.

In Example 15, the method of any one of Examples 1-14 can optionally include: adding a first one of the one or more measurements and a background light measurement by accumulating charge for the first one of the one or more measurements and charge for the background light measurement in a same charge storage unit. For example, a same charge storage unit can be used to determine/perform $S_1 + (\alpha_{F,i} - 1) S_2$.

Example 16 is a method to measure depth that is insensitive to corrupting light due to internal reflections and background light, the method comprising: emitting light by a light source onto a scene; adding, by a first charge storage unit of a pixel, a first measurement (e.g., $S_0$) and a first background light measurement (e.g., $(\alpha_{F,0} - 1) S_2$); adding, by a second charge storage unit of the pixel, a second measurement (e.g., $S_1$) and the second background light measurement (e.g., $(\alpha_{F,1} - 1) S_2$); making a corrupting light measurement (e.g., F) by third charge storage unit; and determining the depth based on charge collected in the first charge storage unit, the second charge storage unit, and the third charge storage unit. For example, measurements usable for determining depth can be performed with just three charge storage units: one charge storage unit for measuring/performing $S_0 + (\alpha_{F,0} - 1) S_2$, one charge storage unit for measuring/performing $S_1 + (\alpha_{F,1} - 1) S_2$, and one charge storage unit for measuring F.

In Example 17, the method of Example 16 can optionally include adding by the first charge storage unit comprising: accumulating, in the first charge storage unit, (1) charge for the first measurement (e.g., $S_0$) and (2) charge for the first background light measurement (e.g., $(\alpha_{F,0} - 1) S_2$), wherein the first background light measurement is based on only background light hitting the pixel. For instance, the first charge storage unit can accumulate measurements and determine/perform $S_0 + (\alpha_{F,0} - 1) S_2$.

In Example 18, the method of Example 17 can optionally include the first background light measurement representing background light collected over a first pre-determined duration. For instance, the first background light measurement is a background light measurement done over a duration that corresponds to $(\alpha_{F,0} - 1)$.

In Example 19, the method of Example 18 can optionally include the first pre-determined duration is based on a first ratio (e.g., $\alpha_{F,0}$) between an amount of corrupting light captured in the first measurement (e.g., $S_0$) and an amount of corrupting light captured in the corrupting light measurement (e.g., F).

In Example 20, the method of any one of Examples 16-19 can optionally include adding by the second charge storage unit comprising: accumulating, in the second charge storage unit, (1) charge for the second measurement (e.g., $S_1$) and (2) charge for the second background light measurement (e.g., $(\alpha_{F,0} - 1) S_2$), wherein the second background light measurement is based on only background light hitting the pixel. For instance, the second charge storage unit can accumulate measurements and determine/perform $S_1 + (\alpha_{F,1} - 1) S_2$.

In Example 21, the method of Example 20 can optionally include the second background light measurement represents background light collected over a second pre-determined duration. For instance, the second background light measurement is a background light measurement done over a duration that corresponds to $(\alpha_{F,1} - 1)$.

In Example 22, the method of Example 21 can optionally include the second pre-determined duration being based on a second ratio (e.g., $\alpha_{F,1}$) between an amount of corrupting light captured in the second measurement ($S_1$) and an amount of corrupting light captured in the corrupting light measurement (F).

In Example 23, the method of any one of Examples 16-22 can optionally include making a corrupting light measurement comprising: controlling the third charge storage unit of a pixel to collect charge based on light hitting the pixel during a time period where the corrupting light hits the pixel but no return light from an object within a field of view of the pixel hits the pixel. Exemplary embodiments are illustrated in FIG. 8 and the description accompanying thereof.

In Example 24, the method of Example 23 can optionally include the time period ending after all corrupting light is collected and before the return light from an object within hits the pixel. Exemplary embodiments are illustrated in FIG. 8 and the description accompanying thereof.

In Example 25, the method of any one of Examples 16-24 can optionally include the light being emitted onto the scene for a duration that is short enough to separate (1) the corrupting light hitting the pixel and (2) reflected light from an object within a field of view of the pixel hitting the pixel in time. Exemplary embodiments are illustrated in FIG. 8 and the description accompanying thereof.

In Example 26, the method of any one of Examples 16-22 can optionally include: the time period ending after a portion of the corrupting light is collected and before the return light from the object hits the pixel. Exemplary embodiments are illustrated in FIG. 9 and the description accompanying thereof.

In Example 27, the method of any one of Examples 16-22 and 26 can optionally include: determining the contribution from the corrupting light by scaling the corrupting light measurement by a gain factor; and removing the contribution from the corrupting light from the first and second measurements. Exemplary embodiments are illustrated in FIG. 9 and the description accompanying thereof.

Example 28 is a method to measure depth that is insensitive to corrupting light due to internal reflections and background light, the method comprising: making a first corrupting light measurement (e.g., $F_1$) with a first emitted light pulse having a first start time, making a second corrupting light measurement (e.g., $F_2$) with a second emitted light pulse, wherein the second emitted light pulse has a same pulse shape as the first emitted light pulse, and the second emitted light pulse has a second start time that offset by a pre-determined amount of time (e.g., $t_d$) relative to the first start time; determining the depth based on one or more measurements (e.g., $S_0$, $S_1$) with the contribution from the corrupting light removed, wherein the contribution from the corrupting light is based on the first corrupting light measurement and the second corrupting light measurement (e.g., $F_1-F_2$). Exemplary embodiments are illustrated in FIG. 10 (for simulating a short light pulse) and the description accompanying thereof.

In Example 29, the method of Example 28 can optionally include the second emitted light pulse having a same duration as the first emitted light pulse. Exemplary embodiments are illustrated in FIG. 10 (for simulating a short light pulse) and the description accompanying thereof.

In Example 30, the method of Example 28 or 29 can optionally include making the first corrupting light measurement comprising: controlling a first charge storage unit of a pixel to collect charge using a first sensor signal; and making the second corrupting light measurement comprising controlling a second charge storage unit of the pixel to collect charge using a second sensor signal having a same start time, a same shape, and a same duration as the first sensor signal. Exemplary embodiments are illustrated in FIG. 10 (for simulating a short light pulse) and the description accompanying thereof.

In Example 31, the method of any one of Examples 28-30 can optionally include: making the first corrupting light measurement comprising controlling a first charge storage unit of a pixel to start collecting charge at or before the first start time (e.g., $-t_1$) and stop collecting charge after the second start time (e.g., after $t_d$); and making the second corrupting light measurement comprises controlling a second charge storage unit of the pixel to start collecting charge at or before the first start time ($-t_1$) and stop collecting charge after the second start time (e.g., after $t_d$). Exemplary embodiments are illustrated in FIG. 10 (for simulating a short light pulse) and the description accompanying thereof.

In Example 32, the method of any one of Examples 28-31 can optionally include a difference between the first corrupting light measurement (e.g., $F_1$) and the second corrupting light measurement (e.g., $F_2$) yielding the contribution from the corrupting light. For instance, the measurement of corrupting light based on a simulated short light pulse can be obtained by determining/performing: $F_1-F_2$.

In Example 33, the method of any one of Examples 28-32 can optionally include a difference between the first corrupting light measurement (e.g., $F_1$) and the second corrupting light measurement (e.g., $F_2$) is equivalent to a corrupting light measurement made with an emitted light pulse having a pulse width corresponding to the pre-determined amount of time. For instance, the quantity $F_1-F_2$ is equivalent to a measurement done with a pulse having a duration of $t_d$).

In Example 34, the method of any one of Examples 28-33 can optionally include removing the contribution from the corrupting light from a given measurement of the one or more measurements by subtracting the given measurement (e.g., $S_i$) by a difference between the first corrupting light measurement and the second corrupting light measurement scaled by a gain factor (e.g., $\alpha_{F,i}(F_1-F_2)$). For instance, removing the contribution from corrupting light can include determining/performing: $S_i-\alpha_{F,i}(F_1-F_2)$.

In Example 35, the method of Example 34 can optionally include the gain factor ($\alpha_{F,i}$) being a ratio of corrupting light captured in the given measurement and an amount of corrupting light captured in the difference.

In Example 36, the method of any one of Examples 28-35 can optionally include: making a third measurement (e.g., $S_2$) without any emitted light pulse to measure background light; and removing a contribution from background light from a given measurement of the one or more measurements by subtracting the given measurement by the third measurement (e.g., performing/determining $S_i-S_2$.

For instance, an adjusted measurement $S_i'$, where the corruption from the corrupting light is removed, can be equal to $S_i-\alpha_{F,i}(F_1-F_2)-S_2$. The adjusted measurement $S_i'$ can be obtained by performing the method in Example 34, 35, or 36.

In Example 37, the method of any one of Examples 28-26 can optionally include: adding (1) the first measurement (e.g., $F_1$) scaled by a gain factor (e.g., $\alpha_{F,i}$) and (2) a third measurement of background light (e.g., $S_2$), in a first charge storage unit of a pixel (e.g., the first charge storage unit can accumulate measurements and perform ($\alpha_{F,i}F_1+S_2$)); and adding (1) the second measurement (e.g., $F_2$) scaled by the gain factor (e.g., $\alpha_{F,i}$) and (2) a given measurement (e.g., $S_i$) of the one or more measurements, in a second charge storage unit of the pixel (e.g., the second charge storage unit can accumulate measurements and perform ($S_i+\alpha_{F,i}F_2$)). For instance, the adjusted measurement $S_i'=S_i-\alpha_{F,i}(F_1-F_2)-S_2$ can be reformulated into two additions, e.g., $S_i'=(S_i+\alpha_{F,i}F_2)-(\alpha_{F,i}F_1+S_2)$, that can be done by two charge storage units.

Example 38 is a depth imager that is insensitive to corrupting light due to internal reflections and background light, the depth imager comprising: an array of sensors, wherein a first sensor of the array of sensors comprises: a first charge storage unit controllable to make a first measurement (e.g., $S_0$), a second charge storage unit controllable to make a second measurement (e.g., $S_i$), a third charge storage unit controllable to make a background light measurement (e.g., $S_2$); and a fourth charge storage unit controllable to make a corrupting light measurement (e.g., F); and a processing circuit to receive and process signals from the array of sensors to form depth estimates. For instance, four charge storage units can be used to make the measurements to be used in determining a depth estimate that is insensitive to corrupting light and background light.

In Example 39, the depth imager of Example 38 can optionally include the processing circuit being to: remove contribution from the background light and contribution from the corrupting light from at least one of: the first measurement and the second measurement based on background light measurement and the corrupting light measurement.

In Example 40, the depth imager of Example 39 can optionally include the processing circuit being to: form depth estimates based on a ratio of the second measurement and a sum of the first measurement and the second measurement after removing the contribution from the background light and the contribution from the corrupting light from at least one of: the first measurement and the second measurement. Examples of the depth estimates equations are illustrated by equations shown herein.

Example 41 is a depth imager that is insensitive to corrupting light due to internal reflections and background light, the depth imager comprising: an array of sensors, wherein a first sensor of the array of sensors comprises: a first charge storage unit controllable to make and accumulate a first measurement and a first background light measurement (e.g., accumulate measurements and perform: $S_0+(\alpha_{F,0}-1)S_2$); a second charge storage unit controllable to make and accumulate a second measurement and a second background light measurement (e.g., accumulate measurements and perform: $S_1+(\alpha_{F,1}-1)S_2$); and a third charge storage unit controllable to measure the corrupting light (e.g., F); and processing circuit to receive and process signals from the array of sensors to form depth estimates.

For instance, three charge storage units can be used to make the measurements to be used in determining a depth estimate that is insensitive to corrupting light and background light.

In Example 42, the depth imager of Example 41 can optionally include the first charge storage unit being controllable to collect background light for a first duration that is defined by a first gain factor (e.g., $(\alpha_F, -1)$); and the second charge storage unit being controllable to collect background light for a second duration that is defined by a second gain factor (e.g., $(\alpha_{F,1}-1)$).

In Example 43, the depth imager of Example 41 or 42 can optionally include the processing circuit being to: compute, for the first sensor, a ratio based on charge collected by the first charge storage unit, charge collected by the second charge storage unit, and charge collected by the third charge storage unit. For instance, the ratio can be based on $$\frac{S_1 - \alpha_{F,1}F + (\alpha_{F,1} - 1)S_2}{[S_0 - \alpha_{F,0}F + (\alpha_{F,0} - 1)S_2] + [S_1 - \alpha_{F,1}F + (\alpha_{F,1} - 1)S_2]}.$$

In Example 44, the depth imager of Example 43 can optionally include the processing circuit being to: form depth estimates based on a lookup table indexed by values of the ratio. For instance, the lookup table can implement the function D=H(x) where x represents the ratio.

Example 45 is a depth imager that is insensitive to corrupting light due to internal reflections and background light, the depth imager comprising: an array of sensors, wherein a first sensor of the array of sensors comprises: a first charge storage unit controllable to make and accumulate a first measurement (e.g., $S_1$) and a first corrupting light measurement (e.g., $\alpha_{F,1}F_2$); a second charge storage unit controllable to make and accumulate a second corrupting light measurement (e.g., $\alpha_{F,1}F$) and a background light measurement (e.g., $S_2$); a third charge storage unit controllable to make and accumulate a second measurement (e.g., $S_0$) and a third corrupting light measurement (e.g., $\alpha_{F,0}F_2$); and a fourth charge storage unit controllable to make and accumulate a fourth corrupting light measurement (e.g., $\alpha_{F,0}F_1$) and the background light measurement (e.g., $S_2$); and processing circuit to receive and process signals from the array of sensors to form depth estimates. For instance, four charge storage units can be used to make the measurements to be used in determining a depth estimate that is insensitive to corrupting light and background light. Additionally, a short light pulse is simulated for the measurements of the corrupting light. Exemplary embodiments are illustrated in FIG. 10 (for simulating a short light pulse) and the description accompanying thereof.

In Example 46, the depth imager of Example 45 can optionally include: a driver to control a light source to: emit a first light pulse having a first start time for the first corrupting light measurement (e.g., $\alpha_{F,1}F_2$) and the third corrupting light measurement (e.g., $\alpha_{F,0}F_2$); and emit a second light pulse for the second corrupting light measurement (e.g., $\alpha_{F,1}F$) and the fourth corrupting light measurement (e.g., $\alpha_{F,0}F$); wherein the second emitted light pulse has a same pulse shape as the first emitted light pulse, and the second emitted light pulse has a second start time that offset by a pre-determined amount of time relative to the first start time. Exemplary embodiments are illustrated in FIG. 10 (for simulating a short light pulse) and the description accompanying thereof.

In Example 47, the depth imager of Example 45 or 46 can optionally include: each one of the first, second, third, and fourth corrupting light measurement comprising a respective number of repeated measurements, and the number corresponds to a respective gain factor (e.g., $\alpha_{F,0}$ and $\alpha_{F,1}$). For instance, the respective gain factors $\alpha_{F,0}$ and $\alpha_{F,1}$ can be achieved by performing repeated measurements of $F_1$ or $F_2$.

In Example 48, the depth imager of any one of Examples 45-47 can optionally include the processing circuit being to: compute, for the first sensor, a ratio based on charge collected by the first charge storage unit, charge collected by the second charge storage unit, charge collected by the third charge storage unit, and charge collected by the fourth charge storage unit. For instance, the ratio can be based on $$\frac{(S_1 + \alpha_{F,1}F_2) - (\alpha_{F,1}F_1 + S_2)}{(S_0 + \alpha_{F,0}F_2) - (\alpha_{F,0}F_1 + S_2) + (S_1 + \alpha_{F,1}F_2) - (\alpha_{F,1}F_1 + S_2)}.$$

In Example 49, the depth imager of Example 48 can optionally include the processing circuit being to: form depth estimates based on a lookup table indexed by values of the ratio. For instance, the lookup table can implement the function D=H(x) where x represents the ratio.

Example 50 is a depth imager that is insensitive to corrupting light due to internal reflections and background light, the depth imager comprising: an array of sensors, wherein a first sensor of the array of sensors comprises: a first charge storage unit controllable to make and accumulate a first measurement (e.g., $S_0$) and a first corrupting light measurement (e.g., $\alpha_{F,0}F_2$); a second charge storage unit controllable to make and accumulate a second measurement (e.g., $S_1$) and a second corrupting light measurement (e.g., $\alpha_{F,0}F$); and a third charge storage unit controllable to make and accumulate a background light measurement (e.g., $S_2$) and the second corrupting light measurement (e.g., $\alpha_{F,0}F_1$); and processing circuit to receive and process signals from the array of sensors to form depth estimates. For instance, three charge storage units can be used to make the measurements to be used in determining a depth estimate that is insensitive to corrupting light and background light. Additionally, a short light pulse is simulated for the measurements of the corrupting light. The second measurement $S_1$ is done in a way to not capture any or very little corrupting light. Exemplary embodiments are illustrated in FIG. 10 (for simulating a short light pulse) and the description accompanying thereof.

In Example 51, the depth imager of Example 50 can optionally include: a driver to control a light source to: emit a first light pulse having a first start time for the first corrupting light measurement (e.g., $\alpha_{F,0}F_2$); and emit a second light pulse for the second corrupting light measurement (e.g., $\alpha_{F,0}F_1$); wherein the second emitted light pulse has a same pulse shape as the first emitted light pulse, and the second emitted light pulse has a second start time that offset by a pre-determined amount of time relative to the first start time. Exemplary embodiments are illustrated in FIG. 10 (for simulating a short light pulse) and the description accompanying thereof.

In Example 52, the depth imager of Example 50 or 51 can optionally include: each one of the first corrupting light measurement and the second corrupting light measurement comprise a number of repeated measurements; and the number corresponds to a gain factor (e.g., $\alpha_{F,0}$). For instance, the gain factors $\alpha_{F,0}$ can be achieved by performing repeated measurements of $F_1$ or $F_2$.

In Example 53, the depth imager of Example 52 can optionally include the gain factor depending on an amount of corrupting light captured in the first measurement (e.g., $S_0$) and an amount of corrupting light captured in the first and second corrupting light measurements (e.g., $F_1-F_2$).

In Example 54, the depth imager of any one of Examples 50-53 can optionally include the processing circuit being to: compute, for the first sensor, a ratio based on charge collected by the first charge storage unit, charge collected by the second charge storage unit, and charge collected by the third charge storage unit. For instance, the ratio can correspond to $$\frac{(S_1 + \alpha_{F,0}F_1) - (S_2 + \alpha_{F,0}F_1)}{(S_0 + \alpha_{F,0}F_2) - (S_2 + \alpha_{F,0}F_1) + (S_1 + \alpha_{F,0}F_1) - (S_2 + \alpha_{F,0}F_1)}.$$

In Example 55, the depth imager of Example 54 can optionally include the processing circuit being to: form depth estimates based on a lookup table indexed by values of the ratio. For instance, the lookup table can implement the function $D=H(x)$ where x represents the ratio.

Example A is an apparatus comprising means for implementing and/or carrying out any one of the methods described herein.

VARIATIONS, ADVANTAGES, APPLICATIONS, AND EXAMPLES

Generally speaking, the embodiments disclosed herein are applicable to depth imagers which suffer from the internal reflection problem. These depth imagers can be found in optical systems include time-of-flight, and range finding systems. Optical systems designed for determining depth, distance, and/or speed can also be found in many applications, including sports electronics, consumer electronics, medical equipment, aerospace/military equipment, automotive electronics, security systems, etc.

The present disclosure includes apparatuses which can include means to implement any one or more parts of the various techniques disclosed herein.

The embodiments described herein (e.g., illustrated in FIGS. 8-12) for addressing the internal reflection issues are distinguished from systems which record a corrupted depth image and performs image processing on the corrupted depth image to filter out the effects caused by internal reflection. The embodiments described herein are in contrast to those systems because a pixel itself is controlled in such a way isolate and measure the effect caused by internal reflections, and a depth calculation takes the corrupting light measurement into account by appropriately removing the effect. In particular, the scheme illustrated by FIGS. 11 and 12 can be particularly good at getting rid of the "flying dust" problem: when dust flies close to the sensor the dust diffracts light, creating a big semi-transparent circle. Industrial applications can be particularly susceptible to the flying dust problem. The flying dust problem goes away completely with the scheme illustrated by FIGS. 11 and 12, because no light is captured in the measurements from nearby diffracting objects like dust.

The embodiments described herein (e.g., illustrated in FIGS. 8-12) can address the internal reflection problem and output uncorrupted depth estimates as close as centimeters away from the depth imager.

In some cases, the charge storage unit that makes a measurement F of corrupting light can be used as a corrupting light detector. The detector can provide useful information to the user, if sufficient corrupting light is collected by the pixels in the sensor. The depth imager can cause an output to be generated to notify the user that there is corrupting light, and ask the user to remove the cause for the internal reflections (e.g., smudge, finger, dust, condensation, etc.).

Moreover, the detector can modify the operating mode of the depth imager to account for corrupting light. For instance, if no corrupting light is detected, the depth imager can compute depth estimates based on any one or more exemplary embodiments accompanying equation (2) or (3). If corrupting light is detected, the depth imager can be configured to make measurements and compute depth estimates based on any one or more exemplary embodiments accompanying equations (4)-(10).

For detecting whether there is sufficient corrupting light, it is possible to sense corrupting light hitting any of the pixels based on the techniques described herein and sense all light hitting the pixels. If the ratio of the corrupting light and all light hitting the pixels is greater than a threshold, the corrupting light detector can output a signal indicating that there is sufficient corrupting light. If it is less than the threshold, there is insufficient corrupting light.

To sum all the corrupting light hitting an array of sensors, electrons from a group of charge storage units measuring the corrupting light can be collected (e.g., by columns) so that it is not necessary to read out each pixel. Similarly, to sum all the light hitting the pixels, electrons from a group of charge storage units measuring all the light can be collected (e.g., by columns) so that it is not necessary to read out each pixel.

It is also imperative to note that all of the specifications, dimensions, and relationships outlined herein (e.g., circuit components) have only been offered for purposes of example and teaching only. Such information may be varied considerably without departing from the spirit of the present disclosure, or the scope of the appended claims and/or examples. The specifications apply only to one non-limiting example and, accordingly, they should be construed as such. In the foregoing description, example embodiments have been described with reference to particular component arrangements. Various modifications and changes may be made to such embodiments without departing from the scope of the appended claims and/or examples. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to making measurements and depth estimation illustrate only some of the possible functions that may be carried out by the circuits illustrated in the FIGURES. Some of these operations may be deleted or removed where appropriate, or these operations may be modified or changed considerably without departing from the scope of the present disclosure. In addition, the timing of these operations may be altered considerably. The operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the disclosure. Note that all optional features of the apparatus described herein may also be implemented with respect to the method or process described herein and specifics in the examples may be used anywhere in one or more embodiments.

What is claimed is:

1. A method to measure depth that is insensitive to corrupting light due to internal reflections and background light, the method comprising:
    making a first corrupting light measurement with a first emitted light pulse having a first start time;
    making a second corrupting light measurement with a second emitted light pulse, wherein the second emitted light pulse has a same pulse shape as the first emitted light pulse, and the second emitted light pulse has a second start time that is offset by a pre-determined amount of time relative to the first start time; and
    determining the depth based on one or more measurements with a contribution from the corrupting light removed, wherein the contribution from the corrupting light is based on the first corrupting light measurement and the second corrupting light measurement;
    wherein a difference between the first corrupting light measurement and the second corrupting light measurement is equivalent to a corrupting light measurement made with an emitted light pulse having a pulse width corresponding to the pre-determined amount of time.

2. The method of claim 1, wherein the second emitted light pulse has a same duration as the first emitted light pulse.

3. The method of claim 1, wherein:
    making the first corrupting light measurement comprises controlling a first charge storage unit of a pixel to collect charge using a first sensor signal; and
    making the second corrupting light measurement comprises controlling a second charge storage unit of the pixel to collect charge using a second sensor signal having a same start time, a same shape, and a same duration as the first sensor signal.

4. The method of claim 1, wherein:
    making the first corrupting light measurement comprises controlling a first charge storage unit of a pixel to start collecting charge at or before the first start time and stop collecting charge after the second start time.

5. The method of claim 1, wherein:
    making the second corrupting light measurement comprises controlling a second charge storage unit of a pixel to start collecting charge at or before the first start time and stop collecting charge after the second start time.

6. The method of claim 1, wherein the difference between the first corrupting light measurement and the second corrupting light measurement yields the contribution from the corrupting light.

7. The method of claim 1, further comprising:
    subtracting the first corrupting light measurement by the second corrupting light measurement to remove a common component of background light and obtain the contribution from the corrupting light.

8. The method of claim 1, further comprising:
    removing the contribution from the corrupting light from a given measurement of the measurements by subtracting the given measurement by a difference between the first corrupting light measurement and the second corrupting light measurement scaled by a gain factor.

9. The method of claim 8, wherein the gain factor is a ratio of corrupting light captured in the given measurement and an amount of corrupting light captured in the difference.

10. The method of claim 1, further comprising:
    making a third measurement without any emitted light pulse to measure background light; and
    removing a contribution from background light from a given measurement of the one or more measurements by subtracting the given measurement by the third measurement.

11. The method of claim 1, wherein:
    adding (1) the first corrupting light measurement scaled by a gain factor and (2) a third measurement of background light, in a first charge storage unit of a pixel; and
    adding (1) the second corrupting light measurement scaled by the gain factor and (2) a given measurement of the one or more measurements, in a second charge storage unit of the pixel.

12. A depth imager that is insensitive to corrupting light due to internal reflections and background light, the depth imager comprising:
    an array of sensors, wherein a first sensor of the array of sensors comprises:
        a first charge storage unit controllable to make and accumulate a first measurement and a first corrupting light measurement, wherein the first measurement and the first corrupting light measurement are made separately in time;
        a second charge storage unit controllable to make and accumulate a second measurement and a second corrupting light measurement, wherein the second measurement and the second corrupting light measurement are made separately in time; and
        a third charge storage unit controllable to make and accumulate a background light measurement and the second corrupting light measurement, wherein the background light measurement and the second corrupting light measurement are made separately in time; and
    processing circuit to receive and process signals from the array of sensors to form depth estimates.

13. The depth imager of claim 12, further comprising:
a driver to control a light source to:
   emit a first light pulse having a first start time for the first corrupting light measurement; and
   emit a second light pulse for the second corrupting light measurement;
   wherein the second emitted light pulse has a same pulse shape as the first emitted light pulse, and the second emitted light pulse has a second start time that offset by a pre-determined amount of time relative to the first start time.

14. The depth imager of claim 12, wherein:
each one of the first corrupting light measurement and the second corrupting light measurement comprise a number of repeated measurements; and
the number corresponds to a gain factor.

15. The depth imager of claim 14, wherein the gain factor depends on an amount of corrupting light captured in the first measurement and an amount of corrupting light captured in the first and second corrupting light measurements.

16. The depth imager of claim 12, wherein the processing circuit is to:
compute, for the first sensor, a ratio based on charge collected by the first charge storage unit, charge collected by the second charge storage unit, and charge collected by the third charge storage unit.

17. The depth imager of claim 16, wherein the processing circuit is to:
form depth estimates based on a lookup table indexed by values of the ratio.

18. A method to measure depth that is insensitive to corrupting light due to internal reflections and background light, the method comprising:
accumulating, by a first charge storage unit, a first measurement and a first corrupting light measurement, wherein the first measurement and the first corrupting light measurement are made separately in time;
accumulating, by a second charge storage unit, a second measurement and a second corrupting light measurement, wherein the second measurement and the second corrupting light measurement are made separately in time;
accumulating, by a third charge storage unit, a background light measurement and the second corrupting light measurement, wherein the background light measurement and the second corrupting light measurement are made separately in time; and
forming a depth estimate based on charge accumulated by the first charge storage unit, charge accumulated by the second charge storage unit, and charge accumulated by the third charge storage unit.

19. The method of claim 18, further comprising:
emitting a first light pulse having a first start time for the first corrupting light measurement; and
emitting a second light pulse for the second corrupting light measurement;
wherein the second emitted light pulse has a same pulse shape as the first emitted light pulse, and the second emitted light pulse has a second start time that offset by a pre-determined amount of time relative to the first start time.

20. The method of claim 18, wherein forming the depth estimate comprises:
computing a ratio based on the charge accumulated by the first charge storage unit, the charge accumulated by the second charge storage unit, and the charge accumulated by the third charge storage unit; and
determining the depth estimate based on a lookup table indexed by values of the ratio.

* * * * *